United States Patent
Walker et al.

(10) Patent No.: US 7,393,279 B2
(45) Date of Patent: Jul. 1, 2008

(54) METHODS AND APPARATUS FOR FACILITATING GAMBLING LOSS INSURANCE POLICIES WITHOUT REQUIRING A SERVER THEREFORE

(75) Inventors: Jay S. Walker, Ridgefield, CT (US); James A. Jorasch, New York, NY (US)

(73) Assignee: Walker Digital, LLC, Stamford, CT (US)

( * ) Notice: Subject to any disclaimer, the term of this patent is extended or adjusted under 35 U.S.C. 154(b) by 19 days.

(21) Appl. No.: 11/257,245

(22) Filed: Oct. 24, 2005

(65) Prior Publication Data

US 2006/0046840 A1    Mar. 2, 2006

Related U.S. Application Data

(60) Continuation-in-part of application No. 11/008,554, filed on Dec. 9, 2004, which is a continuation-in-part of application No. 10/365,154, filed on Feb. 11, 2003, now Pat. No. 6,869,362, which is a continuation-in-part of application No. 09/816,017, filed on Mar. 23, 2001, now Pat. No. 6,561,903, which is a continuation of application No. 09/168,398, filed on Oct. 6, 1998, now Pat. No. 6,254,482, which is a division of application No. 08/804,060, filed on Feb. 21, 1997, now Pat. No. 6,113,493, application No. 11/257,245.

(60) Provisional application No. 60/622,345, filed on Oct. 25, 2004, provisional application No. 60/710,446, filed on Aug. 23, 2005.

(51) Int. Cl.
    *G06F 19/00* (2006.01)

(52) U.S. Cl. ............................................. 463/25

(58) Field of Classification Search ............ 463/25, 463/29
See application file for complete search history.

(56) References Cited

U.S. PATENT DOCUMENTS

| | | | |
|---|---|---|---|
| 3,810,627 A | 5/1974 | Levy | 273/138 A |
| 3,909,002 A | 9/1975 | Levy | 273/138 A |
| 4,669,731 A | 6/1987 | Clarke | 273/143 R |
| 4,679,143 A | 7/1987 | Hagiwara | 364/412 |
| 4,766,539 A | 8/1988 | Fox | 364/401 |
| 5,178,390 A | 1/1993 | Okada | 273/143 R |
| 5,179,517 A | 1/1993 | Sarbin et al. | 364/410 |
| 5,320,356 A | 6/1994 | Cauda | 273/292 |
| 5,483,444 A | 1/1996 | Heintzeman et al. | 364/401 |
| 5,674,128 A | 10/1997 | Holch et al. | 463/42 |

(Continued)

OTHER PUBLICATIONS

Office Action U.S. Appl. No. 11/008,554, Filing Date Dec. 9, 2004 14 pages.

(Continued)

*Primary Examiner*—Scott E. Jones

(57) ABSTRACT

In accordance with some embodiments, a gambling loss insurance policy may be provided to a player. In accordance with some embodiments, a method provides for receiving at a gaming device an amount a player desires to pay for an insurance policy to provide protection against gambling losses and determining, based on the amount, at least one requirement of the policy that the player would be required to satisfy in order to have gambling losses protected under the insurance policy. The method further provides for outputting the at least one requirement to a player (e.g., via a touchscreen menu of the gaming machine).

19 Claims, 18 Drawing Sheets

U.S. PATENT DOCUMENTS

| | | | | |
|---|---|---|---|---|
| 5,695,402 | A | 12/1997 | Stupak | 463/20 |
| 5,766,075 | A | 6/1998 | Cook et al. | 463/25 |
| 5,910,048 | A | 6/1999 | Feinberg | 463/25 |
| 6,048,271 | A | 4/2000 | Barcelou | 463/48 |
| 6,113,493 | A | 9/2000 | Walker et al. | 463/25 |
| 6,254,482 | B1 | 7/2001 | Walker et al. | 463/25 |
| 6,270,409 | B1 * | 8/2001 | Shuster | 463/20 |
| 6,368,216 | B1 | 4/2002 | Hedrick et al. | 463/20 |
| 6,561,903 | B2 * | 5/2003 | Walker et al. | 463/25 |
| 6,869,362 | B2 * | 3/2005 | Walker et al. | 463/25 |
| 6,869,382 | B2 | 3/2005 | Walker et al. | 463/25 |
| 2003/0211886 | A1 * | 11/2003 | Buchanan et al. | 463/29 |

OTHER PUBLICATIONS

Office Action U.S. Appl. No. 11/008,554, Filing Date Dec. 9, 2004 22 pages.

Merriam-Webster's Collegiate Dictionary, Tenth Edition, 1998, pp. 70, 864.

Office Action U.S. Appl. No. 11/423,166, Filing Date Jun. 9, 2006 15 pages.

Office Action U.S. Appl. No. 11/423,166, Filing Date Jun. 9, 2006 8 pages.

Office Action U.S. Appl. No. 11/423,168, Filing Date Jun. 9, 2006 10 pages.

Office Action U.S. Appl. No. 11/423,171, Filing Date Jun. 9, 2006 9 pages.

Office Action U.S. Appl. No. 11/365,154 Filing Date Jun. 9, 2006 4 pages.

Office Action U.S. Appl. No. 11/257,245, Filing Date Jun. 9, 2006 13 pages.

Notice of Allowability U.S. Appl. No. 09/816,017, Filing Date Feb. 15, 2001 3 pages.

Office Action U.S. Appl. No. 09/816,017, Filing Date Jun. 9, 2006 8 pages.

Office Action U.S. Appl. No. 09/168,398, Filing Date Oct. 6, 1998 6 pages.

Office Action U.S. Appl. No. 09/168,3987, 7 pages.

Office Action U.S. Appl. No. 09/168,398, Filing Date Oct. 6, 1998 6 pages.

Notice of Allowability U.S. Appl. No. 09/816,017, Filing Date Dec. 11, 2000 3 pages.

Notice of Allowability U.S. Appl. No. 08/804,060, Filing Date Feb. 21, 1997 9 pages.

Office Action U.S. Appl. No. 08/804,060, Filing Date Feb. 21, 1991 4 pages.

Office Action U.S. Appl. No. 08/804,060 5 pages.

Office Action U.S. Appl. No. 08/804,060, 4 pages.

* cited by examiner

| PLAYER ID 510 | NAME 520 | ADDRESS 530 | CREDIT CARD NUMBER 540 | LIFETIME WIN / (LOSS) 550 | AVERAGE WAGER PER PLAY 560 | AVERAGE SESSION LENGTH 570 |
|---|---|---|---|---|---|---|
| PL-246 | JOE SMITH | 1 ANY ST. CITY, USA | 1111-2222-3333-4444 | $210.50 | $1.00 | 48 MINS. |
| PL-135 | AL JONES | 22 MAIN ST. TOWN, USA | 2222-4444-6666-8888 | ($862.00) | $5.00 | 104 MINS. |
| PL-987 | MARY WHITE | 333 ELM ST. RURAL, USA | 3333-6666-9999-1111 | ($186.25) | $0.50 | 62 MINS. |
| PL-902 | JOHN BROWN | 4444 OAK ST. SUBURB, USA | 4444-5555-6666-7777 | $328.50 | $8.25 | 86 MINS. |

| INSURANCE TERM IDENTIFIER 610 | INSURANCE TERM DESCRIPTION 620 | PREMIUM COST 630 |
|---|---|---|
| TERM-001 | REFUND 100% OF NET LOSSES (UP TO $100) FOR THE FIRST 30 MINUTES OF GAME PLAY ON ANY $1.00 SLOT MACHINE | $79.00 |
| TERM-002 | REFUND 50% OF NET LOSSES (UP TO $200) FOR THE FIRST 20 MINUTES OF GAME PLAY ON ANY $5.00 "CRAZY 7'S" SLOT MACHINE | $48.00 |
| ∘∘∘ | ∘∘∘ | ∘∘∘ |
| TERM-101 | REFUND 50% OF NET LOSSES (UP TO $100) FOR THE FIRST 250 HANDS OF GAME PLAY ON ANY $1.00 VIDEO POKER MACHINE | $39.00 |
| TERM-102 | REFUND 50% OF NET LOSSES (UP TO $50) FOR 24 HOURS OR 3,000 HANDLE-PULLS ON ANY $0.25 SLOT MACHINE | $26.00 |
| TERM-103 | REFUND 50% OF NET LOSSES (UP TO $350) FOR FIRST 90 MINUTES OF PLAY AT $25.00 MINIMUM BLACKJACK | $119.00 |
| ∘∘∘ | ∘∘∘ | ∘∘∘ |
| TERM-201 | AS INSURANCE PAYMENT, THE CASINO WILL POST A CREDIT TO ANY OF YOUR MAJOR CREDIT CARDS | N/A |
| TERM-202 | AS INSURANCE PAYMENT, CURRENCY OR A VOUCHER WILL BE PROVIDED TO YOU AT YOUR MACHINE VIA THE MACHINE OR BY A MEMBER OF OUR CASINO STAFF | N/A |
| TERM-203 | AS INSURANCE PAYMENT, THE CASINO WILL MAIL A CHECK TO THE ADDRESS ON FILE WITH YOUR PLAYER TRACKING ACCOUNT ($2.00 MAILING FEE APPLIES) | N/A |

FIG. 6

| INSURANCE POLICY IDENTIFIER 710 | PLAYER IDENTIFIER 720 | TERM IDENTIFIER 1 730 | TERM IDENTIFIER 2 740 | TERM IDENTIFIER N 750 | TOTAL PREMIUM 760 | TOTAL AMOUNT OF COVERAGE 770 |
|---|---|---|---|---|---|---|
| POL-1234 | PL-246 | TERM-001 | TERM-202 | N/A | $79.00 | $100.00 MAX. |
| POL-1235 | PL-890 | TERM-111 | TERM-306 | TERM-099 | $36.00 | $50.00 MAX. |
| POL-1236 | PL-720 | TERM-283 | TERM-201 | N/A | $14.00 | $25.00 MAX. |
| POL-1237 | PL-308 | TERM-102 | TERM-203 | N/A | $26.00 | $50.00 MAX. |
| POL-1238 | PL-902 | TERM-153 | TERM-064 | TERM-103 | $196.00 | $375.00 MAX |

FIG. 7

| PLAYER IDENTIFIER 810 | SESSION IDENTIFIER 820 | AMOUNT WAGERED 830 | AMOUNT PAID OUT 840 | PLAYER NET WIN / (LOSS) 850 | SESSION START TIME / DATE 860 | SESSION END TIME / DATE 870 |
|---|---|---|---|---|---|---|
| PL-246 | SES-SM-6823 | $241.00 | $182.00 | ($59.00) | 14:33 07/03/2004 | 15:03 07/03/2004 |
| PL-892 | SES-SM-7048 | $184.50 | $216.75 | $32.50 | 14:38 07/03/2004 | 15:08 07/03/2004 |
| PL-308 | SES-SM-7073 | $216.00 | $280.00 | $64.00 | 14:44 07/03/2004 | 15:29 07/03/2004 |
| PL-902 | SES-SM-7108 | $84.25 | $39.75 | ($44.50) | 14:52 07/03/2004 | 15:38 07/03/2004 |
| PL-902 | SES-BJ-4678 | $785.00 | $625.00 | ($160.00) | 15:59 07/03/2004 | TBD |

| POLICY IDENTIFIER 910 | POLICY STATUS 920 | PLAYER QUALIFIED FOR INSURANCE PAYOUT? 930 | INSURANCE PAYOUT AMOUNT 1 940 | INSURANCE PAYOUT AMOUNT N 950 | INSURANCE PAYOUT METHOD 960 | INSURANCE PAYOUT TIME / DATE 970 |
|---|---|---|---|---|---|---|
| POL-1238 | OPEN | TBD | TBD | TBD | CHECK | N/A, TBD |
| POL-1234 | PAID | YES | $59.00 | $59.00 | VOUCHER | 15:03 07/03/2004 |
| POL-1230 | CLOSED | NO | $0.00 | $0.00 | N/A | N/A |
| POL-1224 | PAID | YES | $38.27 | TBD | POST TO CREDIT CARD | 13:38 07/03/2004 |

METHODS AND APPARATUS FOR FACILITATING GAMBLING LOSS INSURANCE POLICIES WITHOUT REQUIRING A SERVER THEREFORE

The present application is a continuation-in-part of U.S. patent application Ser. No. 11/008,554, filed Dec. 9, 2004 in the name of Walker et al. and entitled METHOD AND APPARATUS FOR PROVIDING INSURANCE POLICIES FOR GAMBLING LOSSES;

which application is a continuation-in-part of U.S. application Ser. No. 10/365,154, filed Feb. 11, 2003 in the name of Walker et al. and entitled METHOD AND APPARATUS FOR PROVIDING INSURANCE POLICIES FOR GAMBLING LOSSES, and which issued as U.S. Pat. No. 6,869,362 on Mar. 22, 2005;

which application is, in turn, a continuation-in-part of U.S. patent application Ser. No. 09/816,017, entitled "System and Method for Generating and Executing Insurance Policies for Gambling Losses", filed on Mar. 23, 2001 in the name of Walker et al. and which application issued as U.S. Pat. No. 6,561,903 on May 13, 2003;

which application is, in turn, a continuation of U.S. patent application Ser. No. 09/168,398, filed on Oct. 6, 1998 and issued as U.S. Pat. No. 6,254,482 on Jul. 3, 2004; which is a divisional of U.S. patent application Ser. No. 08/804,060, filed on Feb. 21, 1997 and which issued as U.S. Pat. No. 6,113,493 on Sep. 5, 2000.

The content of each of the above applications is incorporated herein by reference for all purposes.

The present application also claim the benefit of (i) U.S. Provisional Application No. 60/622,345, filed on Oct. 25, 2004 and entitled METHOD AND APPARATUS FOR PROVIDING INSURANCE POLICIES FOR GAMBLING LOSSES; and (ii) U.S. Provisional Application No. 60/710,446, filed Aug. 23, 2005 and entitled METHOD AND APPARATUS FOR PROVIDING INSURANCE POLICIES FOR GAMBLING LOSSES. The entirety of each of these applications is incorporated by reference herein for all purposes.

FIELD OF THE INVENTION

The present invention relates generally to methods and apparatus for gambling.

BACKGROUND OF THE INVENTION

Gambling at casinos has long been a popular activity. Casinos offer a wide variety of games such as slot machines and table games. Games may be played through various devices, or may be conducted without a device. Examples of devices for games include, without limitation, personal computers, video poker machines, pachinko machines, video blackjack machines, video keno machines, video lottery machines, video bingo machines, and reeled slot machines (e.g., mechanical and/or video reeled slot machines).

Regardless of the particular type of game, gambling generally exposes the players to unpredictable gambling losses. Thus, gambling may result in a substantial financial loss to the player.

BRIEF DESCRIPTION OF THE DRAWINGS

The accompanying drawings, which are incorporated in and constitute a part of this specification, illustrate some embodiments of the invention, and together with the description serve to explain the principles of some embodiments of the invention:

FIG. 5 is a tabular representation of a player database according to one or more embodiments of the present invention;

FIG. 6 is a tabular representation of an insurance term database according to one or more embodiments of the present invention;

FIG. 7 is a tabular representation of an insurance policy database according to one or more embodiments of the present invention;

FIG. 8 is a tabular representation of a gambling session database according to one or more embodiments of the present invention;

FIG. 9 is a tabular representation of an insurance policy status database according to one or more embodiments of the present invention;

DETAILED DESCRIPTION

Figure 1:
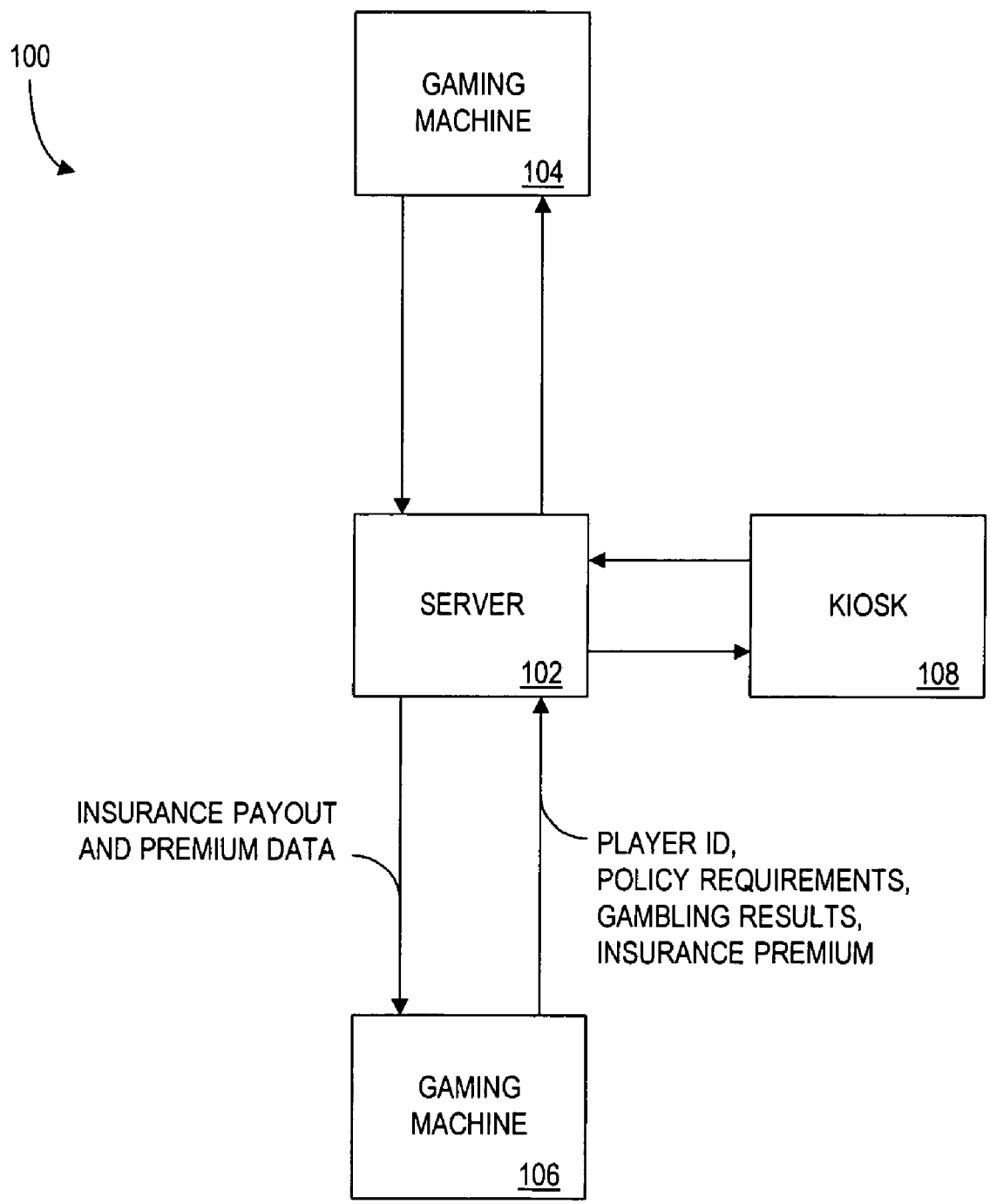
FIG. 1 is a block diagram of a system according to one or more embodiments of the present invention.

Applicants have recognized that many types of players would find it beneficial to be protected against unpredictable gambling losses by an insurance policy. Also, many players would find it desirable to be offered insurance protection that would provide the freedom to move between gaming machines (e.g., be able to play at more than one particular slot machine during an insurance coverage period), while maintaining a high level of playing enjoyment. For instance, some players would find it appealing to be able to purchase an insurance policy at one gaming machine, and to enjoy play covered by the insurance policy at that gaming machine, at that bank of machines, and/or at any other gaming machines.

Players would also find it beneficial to be offered opportunities for playing different types of games (possibly at different locations) under a single insurance coverage. Additionally, many types of players would find it beneficial to have an option to suspend a gambling session while still being covered by an insurance policy once the player resumes the gambling session.

Some players would find it appealing to have flexibility in defining the policy requirements (e.g., amount of loss covered; period of coverage) of an insurance policy. Applicants have also recognized that many types of players would find it desirable to be provided with a method of procuring gambling loss insurance through commonly accessible means such as credit cards, kiosks, point-of-sale terminals, and/or via a personal computer (e.g., in communication with a server over the Internet).

Casinos and other game operators would benefit from providing any of such attractive options described herein to players, which may result in increased revenue for the game operators. For example, an increase in players' enjoyment of game play by making a flexible insurance policy against unpredictable losses available would result in increased play of gaming devices, and thus an increase in revenue for the owners and operators of the gaming devices.

Systems and methods consistent with one or more embodiments of the present invention determine appropriate premiums for gambling insurance policies, and may provide convenient distribution and administration of those policies. According to some embodiments, premiums may be determined automatically.

According to various embodiments of the present invention, a system for providing a gambling loss insurance policy comprises a terminal (e.g., a gaming machine; a gaming device; a kiosk) and a server (e.g., a network server; a game server).

According to one or more embodiments, the terminal includes processing means, user input means, and a display. In some embodiments, the processing means of the terminal executes a game. The user input means may receive a user identifier, game information, and/or policy requirements for the gambling loss insurance policy. The display displays game results and/or information relating to the gambling loss insurance policy. Moreover, the server includes a receiving means, a determining means, and a transmitting means. The receiving means receives the policy requirements from the terminal and the determining means determines a premium cost based on the policy requirements. Finally, the transmitting means transmits an indication of the premium cost to the user. For example, the transmitting means may transmit an indication of the premium cost to a terminal for display to the user, and/or may transmit an indication of the premium cost to the user via other means (e.g., via an audio signal; via an infrared signal).

A method for providing a gambling loss insurance policy in accordance with various embodiments of the present invention comprises several steps. Initially, a terminal (e.g., a gaming machine; a gaming device; a kiosk) receives a user identifier and policy requirements for the gambling loss insurance policy from the user. The terminal transmits the user identifier and the policy requirements to a server (e.g., a network server; a game server), which then determines a premium cost based on the policy requirements. Finally, the server transmits an indication of the premium cost to the user. For example, the transmitting means may transmit an indication of the premium cost to the user at a gaming machine, may transmit an indication of the premium cost to a terminal for display to the user, and/or may transmit an indication of the premium cost to the user via other means (e.g., via e-mail; via postal mail; via a casino employee).

Reference will now be made in detail to various embodiments consistent with the invention, some examples of which are illustrated in the accompanying drawings.

1. System Architecture

FIG. 1 shows a system 100 consistent with one or more embodiments of the present invention having a server 102 (e.g., a game server; a network server) in communication with gaming machines 104, 106 and with a kiosk 108.

Although FIG. 1 shows only two gaming machines 104, 106 and only one kiosk 108 in communication with server 102, those of skill in the art will understand that any number of terminals (e.g., gaming machines and/or kiosks) may be in communication with (e.g., connected to) server 102. For example, some embodiments of the present invention provide for one or more gaming machines in communication with a server, but do not provide for any kiosks. In another example, some embodiments of the present invention provide for one or more kiosks in communication with a server, but do not provide for any gaming machines. In yet another example, some embodiments of the present invention provide for one or more gaming machines and one or more kiosks in communication with a server. In another example, embodiments of the present invention provide for one or more gaming machines which are not connected to a server.

Gaming machines 104, 106 and kiosk 108 may comprise one or more computing devices, such as those based on the INTEL® PENTIUM® processor, adapted to communicate with the server 102, and/or may comprise a personal computer, a portable type of computer, a laptop computer, a palmtop computer, a wearable computer, a hand-held computer, and/or a Personal Digital Assistant (PDA). Other equivalent devices capable of performing the methods specified herein are well known in the art.

Server 102 is preferably a conventional server computer (e.g., a game server; a casino server). Gaming machines 104, 106 are preferably conventional slot machines, but gaming machines 104, 106 may include, without limitation, a personal computer, a video poker machine, a pachinko machine, a video blackjack machine, a video keno machine, a video lottery machine, a video bingo machine, a reeled slot machine (e.g., a mechanical and/or video reeled slot machine), and/or any combination of the above. Other types of gaming machines will be known to those of skill in the art.

Kiosk 108 is preferably a machine or terminal operable in accordance with various embodiments described herein to facilitate establishing a gambling loss insurance policy, purchasing a gambling loss insurance policy (e.g., by a user), administering a gambling loss insurance policy, and/or providing a payout to a user in accordance with a gambling loss insurance policy. According to some embodiments, kiosk 108 is not operable to provide a gambling session. Kiosk 108 may include, without limitation, a terminal on a casino floor, a personal computer (e.g., operable to communicate with server 102 via the Internet), a set-top box, a point-of-sale terminal, a vending machine, and/or an automatic teller machine. Other types of kiosks will be known to those of skill in the art.

In operation according to various embodiments, gaming machines 104, 106 and kiosk 108 transmit to server 102 information such as player identification information (e.g., player ID number), policy requirements, and/or insurance premiums. Accordingly, any of various types of terminals (e.g., gaming machines; kiosks) may be used by a user, for example, for establishing a gambling loss insurance policy, purchasing a gambling loss insurance policy, and/or receiving a payout in accordance with a gambling loss insurance policy. According to one or more embodiments, gaming machines 104, 106 may also transmit gambling results to server 102. Accordingly, gaming machines 104, 106 may be used to facilitate play that is covered by a gambling loss insurance policy. According to various embodiments of the present invention, server 102 is operable to transmit to gaming machines 104, 106 and kiosk 108 information such as insurance premium and/or payout data.

According to some embodiments, one or more of gaming machines 104, 106 and kiosk 108 are operable to perform some or all of the functionality of server 102. For example, gaming machine 104 may be configured to determine information such as insurance premium and/or payout data without receiving such information from server 102, and without transmitting information such as player ID number, policy requirements, insurance premiums, and/or gambling results to server 102.

As noted above, any number of gaming machines and/or kiosks may be in communication with the server 102. The two gaming machines 104, 106 and the single kiosk 108 are depicted in FIG. 1 solely for purposes of illustration.

The server 102 may communicate with one or more terminals, such as gaming machines and/or kiosks, directly or indirectly. Communication may take place via a network, including, without limitation, the Internet, wireless network protocol, local area network or a combination thereof; through a Web site maintained by the server 102 on a remote server; or over an on-line data network including, without limitation, commercial on-line service providers and bulletin board systems. In yet other embodiments, the terminals may communicate with the server 102 over RF, cable TV, satellite links and the like.

Those skilled in the art will understand that devices in communication with each other need not be continually transmitting to each other. On the contrary, such devices need only transmit to each other as necessary, and may actually refrain from exchanging data most of the time. For example, a device in communication with another device via the Internet may not transmit data to the other device for weeks at a time.

The server 102 may function as a "Web server" that generates Web pages (documents on the Web that typically include an HTML file and associated graphics and script files) that may be accessed via the Web and allows communication with the server 102 in a manner known in the art.

FIG. 1 depicts only some embodiments of the present invention. Other arrangements of devices to perform various methods specified herein will be readily appreciated by those of skill in the art.

Figure 2:
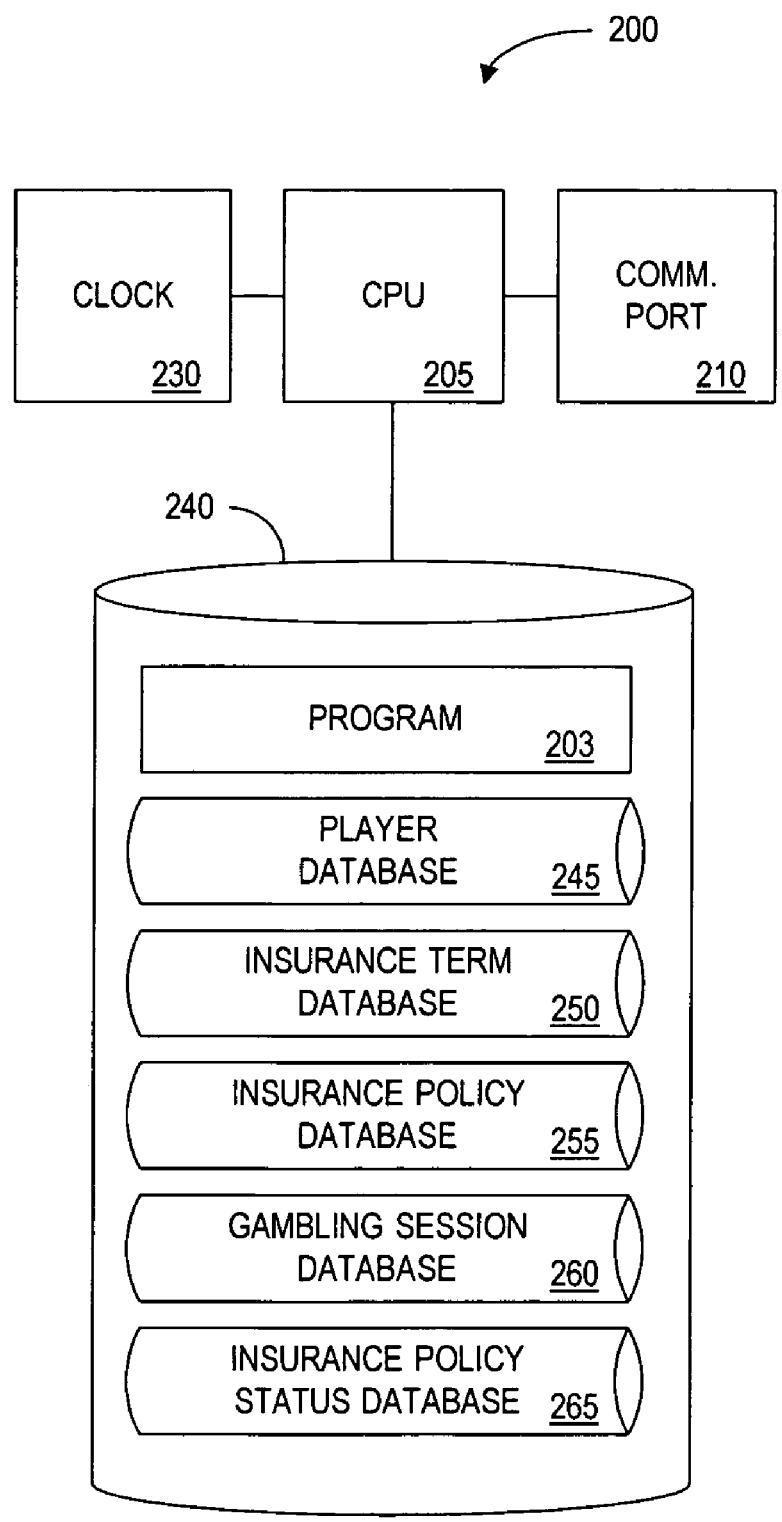
FIG. 2 is a detailed block diagram of a network server according to one or more embodiments of the present invention.

FIG. 2 shows a detailed block diagram of an embodiment of server 102 of FIG. 1. It will be understood by those of skill in the art that network server 200 may be configured in many different ways. The network server 200 may be implemented as a system controller, a dedicated hardware circuit, an appropriately programmed general-purpose computer, or any other appropriate device including, without limitation, electronic, mechanical or electro-mechanical devices. For example, network server 200 may be a conventional server computer such as an RS 6000 manufactured by IBM CORPORATION. Alternatively, the function of network server 200 may be distributed across multiple computing systems as described below.

The network server 200 of the illustrated embodiment comprises a central processing unit (CPU) 205, such as one or more INTEL® PENTIUM® microprocessors. The network server 200 of the illustrated embodiment also comprises a communication port 210. Thus, network server 200 is able to receive and/or transmit information using the communication port 210. Communication port 210 provides communication between network server 200 and a network of terminals, including one or more gaming machines and/or kiosks. Communication port 210 may comprise, without limitation, a serial port, an infrared port, a telephone port, a cable modem, a network router, and/or a radio frequency transceiver.

Network server 200 may also be configured in a distributed architecture, wherein databases and processors are housed in separate units or locations. Some such servers perform primary processing functions and contain at a minimum, a RAM, a ROM, and a general processor. In such an embodiment, each of these servers is attached to a wide-area network (WAN) hub that serves as a primary communication link with the other servers and gaming machines. The WAN hub may have minimal processing capability itself, serving primarily as a communications router.

The CPU 205 is also in communication with a data storage device 240. The data storage device 240 may comprise, for example, magnetic memory (e.g., a hard magnetic disk drive), optical memory, flash memory, semiconductor memory or any combination thereof. The data storage device 240 may include, for example, Random Access Memory (RAM), Read-Only Memory (ROM), a compact disc (e.g., CD-ROM) and/or a hard disk. The CPU 205 and the data storage device 240 may each be, for example: (i) located entirely within a single computer or computing device; or (ii) connected to each other by a remote communication medium including, without limitation, a serial port cable, a telephone line, a network connection or a radio frequency transceiver. In some embodiments, the network server 200 may comprise one or more computers that are connected to a remote server computer for maintaining databases.

The data storage device 202 stores a program 203 for controlling the CPU 205. The CPU 205 performs instructions of the program 203, and thereby operates in accordance with the present invention, and particularly in accordance with one or more of the methods described in detail herein. The program 203 may be stored in a compressed, uncompiled and/or encrypted format, as well as in a variety of other forms known in the art. The program 203 furthermore includes program elements that may be necessary, including, without limitation, an operating system, a database management system and "device drivers" for allowing the CPU 205 to interface with one or more peripheral devices. Appropriate program elements are well known to those skilled in the art, and need not be described in detail herein.

According to some embodiments of the present invention, the instructions of the program 203 may be read into a main memory from another computer-readable medium, such as into RAM from a hard drive or ROM. Execution of sequences of the instructions in program 203 causes CPU 205 to perform various process steps described herein. In alternative embodiments, hard-wired circuitry may be used in place of, or in combination with, software instructions for implementation of one or more processes of the present invention, as would be understood by those of skill in the art. Thus, embodiments of the present invention are not limited to hardware, software or any specific combination of hardware and software.

Data storage device 240 also contains databases used in processing transactions in accordance with various embodiments of the present invention. In some embodiments, database software such as ORACLE7, manufactured by ORACLE CORPORATION, creates and manages one or more of these databases.

The data storage device 240 stores (i) a player database 245, (ii) an insurance term database 250, (iii) an insurance policy database 255, (iv) a gambling session database 260, and (v) an insurance policy status database 265. These databases are described in detail below and depicted with exemplary entries in the following description and in the accompanying figures. As will be understood by those skilled in the art, the schematic illustrations and accompanying descriptions of the databases presented herein are exemplary arrangements for stored representations of information. A number of other arrangements may be employed besides those suggested by the tables shown. For example, those skilled in the art will understand that the number, format and/or content of the databases can be different from those illustrated herein. Similarly, the illustrated entries of the databases represent exemplary information only; those skilled in the art will understand that the number, format and/or content of the entries can be different from those illustrated herein. Based on the present disclosure many other arrangements of data will be readily understood by those of skill in the art.

In some alternative embodiments, one or more of the player database 245, the insurance term database 250, the insurance policy database 255, the gambling session database 260, and the insurance policy status database 265 may be stored at one or more terminals, such as a gaming machine or kiosk. Accordingly, in some embodiments one or more insurance policies may be generated, administered and/or offered by a terminal (e.g., kiosk 108) without requiring communication with a server (e.g., server 102).

Insurance premium calculation algorithms (not shown) are preferably stored in storage device 240 and executed by CPU 205.

The CPU 205 is also in communication with a clock 225. Information from clock 225 may be used by CPU 205, for example, in establishing terms of a gambling loss insurance policy (e.g., by determining a start time of a coverage period) and/or in determining the status of a gambling loss insurance policy (e.g., determining whether a gambling loss insurance policy has expired). In some embodiments, CPU 205 may include clock 225.

Figure 3:
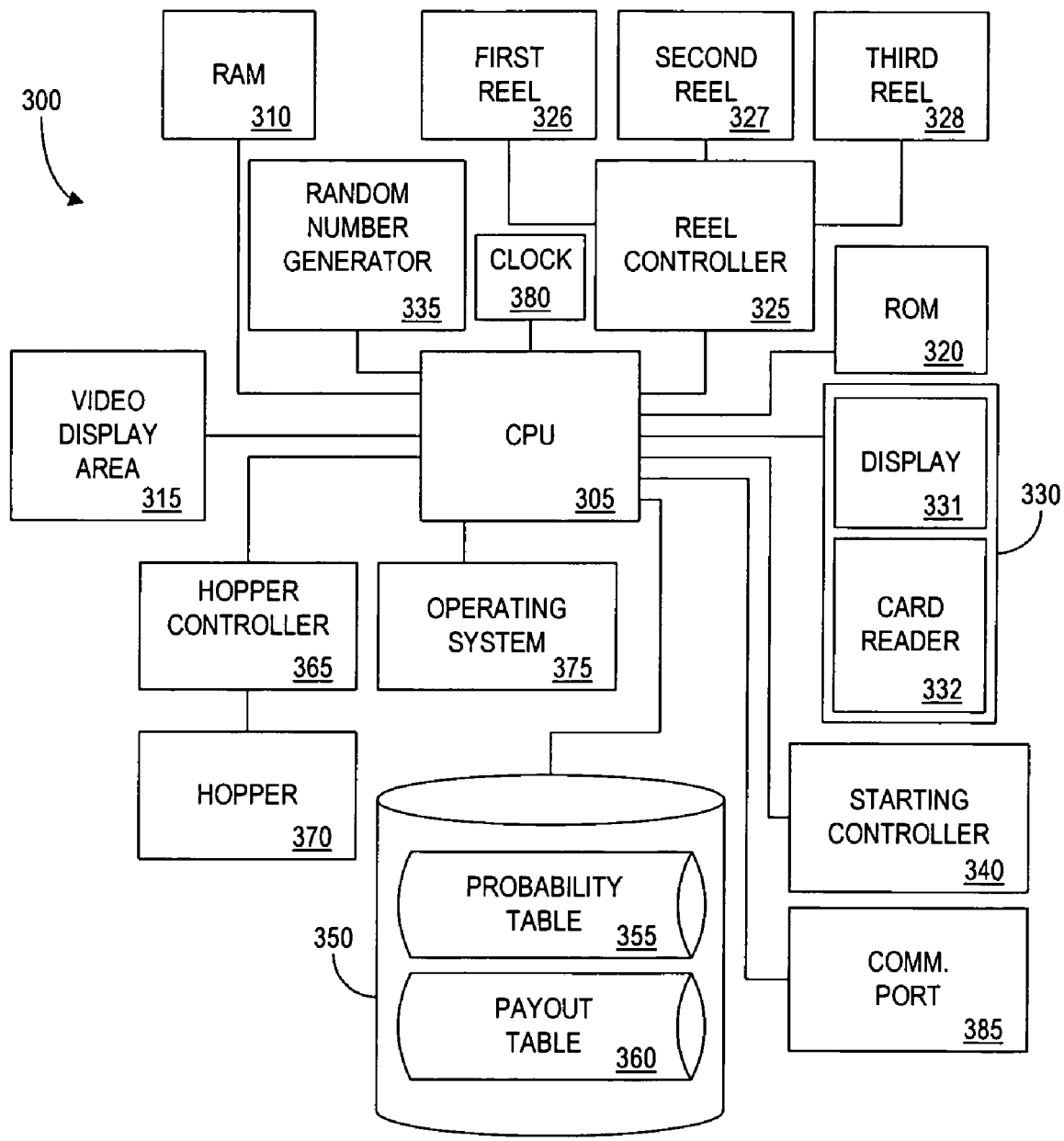
FIG. 3 is a detailed block diagram of a slot machine according to one or more embodiments of the present invention.

FIG. 3 shows a detailed block diagram of an exemplary embodiment 300 of the gaming machine 104 (FIG. 1). Slot machine 300 may be implemented as a dedicated hardware circuit, an appropriately programmed general-purpose computer, or any other appropriate device including, without limitation, electronic, mechanical or electromechanical devices. Accordingly, the gaming machine need not include the various exemplary components depicted in FIG. 3.

Slot machine 300 includes a CPU 305 in communication with a RAM 310, a video display area 315, a ROM 320, a reel controller 325, a player card tracking device 330, a random number generator 335, a starting controller 340, communication port 385, a data storage device 350, a hopper controller 365, hopper 370, an operating system 375 (typically comprising software stored in memory), and a clock 380. Communication port 385 enables communication between slot machine 300 and a server (e.g., network server 200) and/or one or more other terminals (e.g., gaming machines; kiosks). Communication port 385 may comprise, without limitation, a serial port, an infrared port, a telephone port, a cable modem, a network router, and/or a radio frequency transceiver. Data storage device 350 operatively stores a probability table 355 and a payout table 360.

Slot machine 300 operates to provide one or more games of chance in a conventional manner. The player starts the machine by inserting a coin or using electronic credit (such as by inserting a cashless gaming ticket), and initiating starting controller 340. Under control of a program stored, for example, in data storage device 350 or ROM 320, CPU 305 directs random number generator 335 to generate a random number. CPU 305 looks up the generated random number in stored probability table 355 and finds the corresponding outcome. Based on the identified outcome, CPU 305 locates the appropriate payout in the stored payout table 360. CPU 305 also directs reel controller 325 to spin reels 326, 327, 328 and to stop them at a point when they display a combination of symbols corresponding to the selected payout. When the player wins, the slot machine 300 stores the credit balance in RAM 310, and displays the balance in video display area 315.

Hopper controller 365 is connected to hopper 370 for dispensing coins. When the player requests to cash out by pushing a button (not shown) on slot machine 300, CPU 305 checks RAM 310 to see whether the player has any credits and, if so, signals hopper controller 365 to release an appropriate number of coins into a coin tray (not shown).

In alternative embodiments, slot machine 300 does not include reel controller 325, and reels 326, 327, 328. Instead, video display area 315 graphically displays simulated representations of objects contained in the selected game, such as graphical reels or playing cards. These representations are preferably animated or displayed to simulate playing of the selected game.

Player card tracking device 330 includes display 331 and card reader 332. Players insert player tracking cards into card reader 332. Tracking cards can be plastic cards with magnetic strips electronically storing respective player ID numbers. Display 331 displays information concerning the use of player card tracking device 330, and allows communications to be displayed to the player regarding insurance policy requirements. Display 331 may be a touch screen display for receiving signals from the player concerning the selection of policy requirements.

Alternatively, slot machine 300 or player card tracking device 330 may include one or more separate input buttons (not shown) for the players to select policy requirements and provide other input such as a personal identification number (PIN). Credits earned during play are stored locally in RAM 310 and an indication of credits earned may be displayed in video display area 315. Slot machine 300 or player card tracking device 330 could also include one or more separate input devices for selecting the policy requirements.

In other embodiments, slot machine 300 recognizes the identity of players through player identification devices other than player card tracking device 330, thereby eliminating the need for players to carry player identification cards. For example, slot machine 300 could include a keypad, at which players enter either their player identification numbers or their names along with a secured password. Slot machine 300 could also include a device for measuring player biometrics (e.g., fingerprint, voice, or retinal detection) to identify players. In another embodiment, the player is issued a special card which stores policy requirements and the name/identifier of the player.

Commercially available player card tracking devices include, for example, the MASTERCOM device available from BALLY MANUFACTURING. (See, for example, U.S. Pat. No. 5,429,361 to Raven et al.). Such player tracking devices include a magnetic card reader and a numeric keypad for entry of player information.

Information from clock 380 may be used by CPU 305, for example, in establishing terms of a gambling loss insurance policy (e.g., by determining a start time of a coverage period) and/or in determining the status of a gambling loss insurance policy (e.g., determining whether a gambling loss insurance policy has expired). In some embodiments, CPU 305 may include clock 380.

Figure 4:
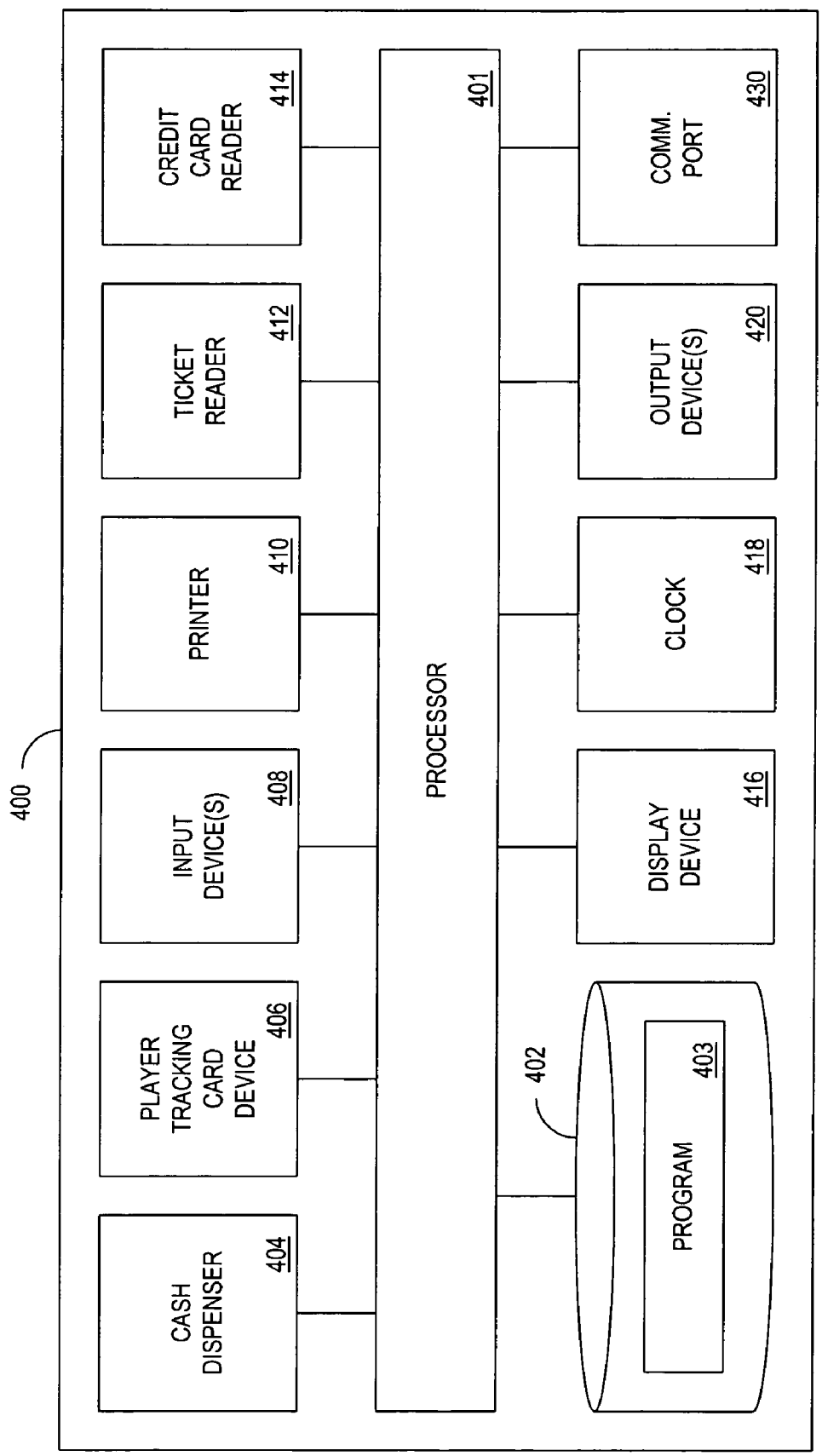
FIG. 4 is a detailed block diagram of a kiosk according to one or more embodiments of the present invention.

FIG. 4 illustrates an embodiment 400 of kiosk 108 (FIG. 1). Kiosk 400 may include, without limitation, a terminal in a casino (e.g., on a casino floor; for use by a cashier or other casino personnel), a personal computer (e.g., operable to communicate with network server 200 via the Internet), a set-top box, a point-of-sale terminal, a vending machine, and/or an automatic teller machine. Other types of kiosks will be known to those of skill in the art.

Kiosk 400 may be implemented as a dedicated hardware circuit, an appropriately programmed general-purpose computer, or any other appropriate device including, without limitation, electronic, mechanical or electromechanical devices. Accordingly, the kiosk need not include the various exemplary components depicted in FIG. 4.

The kiosk 400 of the illustrated embodiment comprises a processor 401, such as one or more INTEL® PENTIUM® microprocessors. The processor 401 is in communication with a data storage device 402. The data storage device 402 may comprise, without limitation, magnetic memory, optical memory, semiconductor memory, flash memory or any combination thereof. The data storage device 402 may include, for example, Random Access Memory (RAM), Read-Only Memory (ROM), a compact disc and/or a hard disk. The processor 401 and the data storage device 402 may each be, for example: (i) located entirely within a single computer or computing device; or (ii) connected to each other by a remote communication medium, including, without limitation, a serial port cable, a telephone line, a network connection or a radio frequency transceiver. In some embodiments, the kiosk may comprise one or more computers that are connected to a remote server computer for maintaining databases.

The data storage device 402 stores a program 403 for controlling the processor 401. The processor 401 performs instructions of the program 403, and thereby operates in accordance with the present invention, and particularly in accordance with one or more of the methods described in detail herein. The program 403 may be stored in a compressed, uncompiled and/or encrypted format, as well as in a variety of other forms known in the art. The program 403 furthermore includes program elements that may be necessary, including, without limitation, an operating system, a database management system and "device drivers" for allowing the processor 401 to interface with one or more peripheral devices. Appropriate program elements are well known to those skilled in the art, and need not be described in detail herein.

According to some embodiments, kiosk 400 is not operable (at least at some time) to provide a game of chance. For example, a terminal on a casino floor (e.g., an insurance kiosk) in communication with a casino server may be operable to establish a gambling loss insurance policy, purchase a gambling loss insurance policy, administer a gambling loss insurance policy, and/or provide a payout to a user in accordance with a gambling loss insurance policy, but does not offer any games of chance. According to some alternative embodiments, program 403 of kiosk 400 may include instructions executable by processor 401 to provide a player with a game of chance, or kiosk 400 may otherwise be configured to provide a game of chance at least at some time or times. For example, kiosk 400 may be a personal computer configured (e.g., storing an Internet browser application and any appropriate plug-in software, executable by processor 401) to facilitate play of an on-line game of blackjack via communication over the Internet with a casino game server. At other times, the user may not be able to participate in a game of chance using the personal computer (e.g., if access to the casino game server is not available), but the personal computer may still be able to facilitate other various processes described herein (e.g., by communicating with another server to establish a gambling loss insurance policy). Those of skill in the art will thus understand that a terminal in accordance with one or more embodiments of the present invention may be operable to provide a game of chance at all times, at some times, or never.

According to an embodiment of the present invention, the instructions of the program 403 may be read into a main memory from another computer-readable medium, such as into RAM from a hard drive or ROM. Execution of sequences of the instructions in program 403 causes processor 401 to perform various process steps described herein. In alternative embodiments, hard-wired circuitry may be used in place of, or in combination with, software instructions for implementation of the processes of the present invention, as would be understood by those of skill in the art. Thus, embodiments of the present invention are not limited to hardware, software or any specific combination of hardware and software.

The processor 401 may also be in communication with a cash dispenser 404, which dispenses coins and/or bills to people (e.g., a player; a gambling loss insurance policyholder; a cashier) that have requested to have funds be dispensed. In another example, the cash dispenser 404 may dispense bills and/or tokens without a request by a user to have funds be dispensed (e.g., may dispense automatically in response to a signal from the processor 401). The cash dispenser 404 may alternatively be a cash drawer that may be automatically opened upon command from the processor 401.

The processor 401 may also be in communication with a player tracking card device 406, which performs functions related to player tracking cards, such as reading player tracking cards and communicating information read from such cards to the processor 401.

The processor 401 may also be in communication with one or more input devices 408 that receive input from a cashier, customer or an operator of the kiosk. Input device(s) 408 may comprise one or more of a variety of devices, including, without limitation, one or more buttons, touch screens, handles, keypads, biometric devices (e.g., retinal scanners; fingerprint scanners), pointer devices (e.g., a mouse, or trackball), microphones or any combination of the above. Input device(s) 408 may be used for receiving information that may be used to identify a user (e.g., by receiving a code at a keypad; by receiving an indication of a fingerprint).

The processor 401 may also be in communication with a printer 410, which may be commanded to print onto a substrate, such as paper or other material. Printing may be via ink jet, laser printing or other methodology for registering indicia on a substrate. Alternatively, the substrate may be registered with indicia by deforming the substrate in a variety of ways known in the art, including, without limitation, punching holes in the substrate and raising or lowering portions of the substrate relative to other portions. The printer 410 may be used for printing, e.g., receipts, coupons, cashless gaming receipts and/or tickets.

The processor 401 may also be in communication with a ticket reader 412, which is capable of reading, for example, receipts, coupons, cashless gaming receipts and/or tickets, and particularly indicia registered on any such substrates. The ticket reader 412 may use optical sensing of printed indicia, for example, and optical character recognition to read indicia from a ticket inserted in the ticket reader 412.

The processor 401 may also be in communication with a credit card reader 414. Such devices are known in the art, and generally allow a card such as a credit card or debit card to be inserted there within. The card may include a magnetic stripe or other form of data storage, which the credit card reader 414 is capable of sensing and interpreting. Typically, the credit card reader allows a credit card transaction to be processed by communication with a credit card clearinghouse in a manner known in the art.

The processor 401 may also be in communication with a display device 416, which displays images in a manner known in the art. Typical display devices include, without limitation, liquid crystal displays, plasma displays and video display monitors.

The processor 401 may also be in communication with a clock 418. Information from clock 418 may be used by processor 401, for example, in establishing terms of a gambling loss insurance policy (e.g., by determining a start time of a coverage period) and/or in determining the status of a gambling loss insurance policy (e.g., determining whether a gambling loss insurance policy has expired). In some embodiments, processor 401 may include clock 418. Clock 418 may transmit a signal to display device 416 so that the player can see the current time.

According to some embodiments, in addition to (or in lieu of) one or more of the various devices described above for providing output (e.g., printer 410; display device 416), the processor 401 may be in communication with one or more output devices 420 that provides output to a cashier, a player or a user of the kiosk. Output device(s) 420 may comprise one or more of a variety of devices, including, without limitation, a wireless signal transmitter, an infrared transmitter, a radio transmitter, an infrared port (e.g., for communicating with a second kiosk or with a portable device of a player), an audio speaker (e.g., for outputting policy and/or payout information, in addition to or in lieu of such information being output via a display device 416) or any combination thereof.

2. Databases

Referring now to FIG. 5, an exemplary tabular representation 500 illustrates an exemplary embodiment of the player database 245 (FIG. 2) that may be stored, for example, in network server 200. The tabular representation 500 of the player database 245 includes a number of example records or entries, each defining a player who may be, for example, a member of a slot club of a casino, or otherwise registered with or known to a casino or other entity. Those skilled in the art will understand that the player database 245 may include any number of entries.

The tabular representation 500 also defines fields for each of the entries or records. The fields specify: (i) a player identifier 510 that uniquely identifies a player, (ii) a name 520 of the player, (iii) an address 530 associated with the player, (iv) a credit card number 540 corresponding to a credit card account associated with the player, (v) a lifetime win/(loss) 550 of the player, (vii) an average wager per play 560 associated with the player, and (viii) an average session length 570 associated with the player.

The information in the player database 245 may be created and/or updated, for example, based on information received from a player, a casino employee, a terminal, a gaming machine 104, an input device 408, and/or any combination thereof. For example, the information may be created when a player registers with a casino and receives a player tracking card (e.g., encoded with a player identifier). The information may be subsequently updated, for example, when a player requests to update the information (e.g., when a player indicates a desire to change an associated credit card number 540) or when additional information is obtained about the player via the casino's interactions with the player (e.g., the lifetime win/(loss) 550 may be updated on an ongoing or periodic basis as the player plays games at the casino).

It should be understood that although the player identifier 510 and information related to each registered player are described in detail, a player need not be registered in order to be provided with a gambling loss insurance policy or to benefit from other embodiments of the present invention. Accordingly, registration of a player and storing of information related to a player (e.g., in a player database) is not necessary for practice of some embodiments of the present invention.

The player identifier 510 may be, for example, a numeric, alphanumeric, or other type of code associated with a player who may operate a gaming machine or kiosk, or may play a table game at a casino. The player identifier 510 is preferably unique, and may be generated or selected, for example, by the slot machine 300 or by the player (e.g., when a player first registers with a casino). For each player, the player database 245 may also store the player's name 520 (e.g., for use in outputting messages to the player). In one or more embodiments the player's name may comprise a nickname, "handle", or other designation for the player that is selected by the player or a casino. In one or more embodiments, the nickname may comprise a designation that reflects the player's status (e.g., "premium player"; "low risk player"). Such a status may indicate, for example, the typical spending range of the player, the typical session length of the player, or other indication about the player. Such a designation may or may not be known to the player.

For each player, the player database 245 may also store an address 530 associated with the player (e.g., for use in communicating with the player). In one or more embodiments the player's address may comprise a street or postal address of the player. In one or more embodiments, the address may comprise an address for telecommunications (e.g., a telephone number; a pager number; an e-mail address). Although tabular representation 500 illustrates a single street address for each exemplary player, those of ordinary skill in the art will understand that more than one address and/or type of address may be associated with a player.

The credit card number 540 corresponds to a credit card account and may be used, for example, to credit a payment to the player (e.g., if the player wins a gambling payout; if the player receives a benefit in accordance with a gambling loss insurance policy) and/or to debit an amount (e.g., a wager amount; a premium amount). Although tabular representation 500 depicts a credit card number in the player database 245, those of skill in the art will recognize that various other types of financial account identifiers associated with the player may be used in addition to or in lieu of a credit card number (e.g., a debit card account number; a checking account number; a casino financial account number; digital payment protocol information).

The lifetime win/(loss) 550 stores an indication of the actual dollar amount that the corresponding player has won or lost while gambling, based on the playing activity of the player since the playing activity of the player has been tracked. A loss is indicated in parentheses in the tabular representation 500. In some embodiments, the historical lifetime win/(loss) 550 may be a true "lifetime" lifetime win/(loss) (e.g., may reflect the lifetime win/(loss) since the first time the player was tracked). Alternatively, or in addition, a historical lifetime win/(loss) based on other periods of time may be stored. For example, an annual or session lifetime win/(loss) may be stored.

The average wager per play 560 stores an indication of the actual dollar amount that the corresponding player wagers on average on each play of a game. In some embodiments, the average wager per play 560 may be a lifetime average across all plays tracked for the player. In other embodiments, an average wager per play based on other periods of time may be stored in addition to or instead of a lifetime average wager per play. For example, an average wager per play during the past twelve months or average wager per play during a particular session may be stored. In still other embodiments, information about an average amount wagered per session may be stored in addition to or in lieu of an average wager per play. In some embodiments, average wager information may reflect play of one or more types of games (e.g., $1.50 per play across all combined blackjack and video poker play) and/or respective averages for a plurality of different games may be stored (e.g., $10.00 for blackjack; $2.00 for video poker).

The average session length 570 stores an indication of a period of time that the corresponding player spends gambling on average. In some embodiments, the average session length 570 may be a lifetime average across all sessions tracked for the player. In other embodiments, an average session length based on sessions tracked during other periods of time may be stored in addition to or instead of a lifetime average session length. For example, an average session length during the past six months of sessions or average session length during a particular casino visit may be stored.

Not all of the fields depicted in FIG. 5 are required, and various substitutions, deletions and other changes to the tabular representation will be readily apparent to those of ordinary skill in the art. For example, the average wager per play is not needed in many embodiments. The depicted fields, for example the address information, are for illustration only. Various other forms of address information are described herein and still others will be readily apparent to those of skill in the art.

Referring now to FIG. 6, an exemplary tabular representation 600 illustrates an exemplary embodiment of insurance term database 250 (FIG. 2) that may be stored, for example, in network server 200. The tabular representation 600 of the insurance term database 250 includes a number of example records or entries, each defining an insurance term that may be used in establishing a gambling loss insurance policy. For example, one or more insurance terms may be selected by a player, a casino employee, a terminal, and/or a server in creating and/or offering an insurance policy. Those skilled in the art will understand that the insurance term database 250 may include any number of entries.

The tabular representation 600 also defines fields for each of the entries or records. The fields specify: (i) an insurance term identifier 610 that uniquely identifies an insurance term, (ii) an insurance term description 620 of the insurance term that represents one or more requirements of the insurance term, and (iii) a premium cost 630 associated with the insurance term.

The information in the insurance term database 250 may be created and/or updated, for example, based on information received from a player, a casino employee, a gaming machine 104, a slot machine 300, a kiosk 400, and/or an input device 408. For example, an insurance term (or one or more requirements of the insurance term) may be established by a casino. In another example, a player may define an insurance term (or one or more requirements of the insurance term). As described variously herein, a player may input information about a desired insurance term at a gaming machine (e.g., when prompted for a coverage period, a player may request insurance coverage for the first thirty minutes of game play by inputting "30" at a keypad of a slot machine 300).

According to one or more embodiments of the present invention, some characteristics or requirements of an insurance term may be selected by a player, and other aspects may be selected by a server, a casino employee, and/or a terminal. For example, insurance term "TERM-001" in tabular representation 600 may initially have corresponded to an offer for refunding 100% of net losses (up to $100) on any $1.00 slot machine. Slot machine 300 then prompted the player to select a desired period of coverage for "TERM-001" from a drop-down menu of suggested policy coverage periods. In response, the player selected "30 MINS." by touching a touch screen of slot machine 300. Accordingly, the insurance term description of "TERM-001" was updated to reflect that "TERM-001" applies to the first thirty minutes of game play.

Alternatively, a new term may be established that is based at least in part on an existing term. For example, rather than modifying the entry for "TERM-001" as in the preceding example, once the player selected "30 MINS." a new term entry (e.g., identified as "TERM-001-30M") (not shown) that indicated the new term had all of the requirements of "TERM-001" and was also limited to the first thirty minutes of game play could have been created in insurance terms database 650. Other ways for creating, updating and/or storing an indication of an insurance term will be readily apparent to those of ordinary skill in the art.

The insurance term identifier 610 may be, for example, a numeric, alphanumeric, or other type of code associated with an insurance term. The insurance term identifier 610 is preferably unique, and may be generated or selected, for example, by a server or terminal. For each insurance term, the insurance term database 250 may also store an insurance term description 620. The insurance term description 620 preferably indicates one or more conditions or requirements represented by the insurance term, such as, without limitation: (i) a covered loss limit (e.g., "net losses (up to $100)"), (ii) a payout limit (or other benefit limit) (e.g., "50% of net losses"; "two free show tickets"), (iii) a period of coverage (e.g., "the first 30 minutes of game play), (iv) a covered wager amount (e.g., "$1"), (v) a type of game (e.g., "Blackjack"), (vi) a type of gaming machine (e.g., "slot machine"), (vii) a number of plays covered (e.g., "the first 250 hands of game play"), and (viii) a method for providing an insurance payout (e.g., "the casino will mail a check to the address on file").

The insurance term description 620 may be used, for example, in communicating information about the insurance term to the player, in determining an insurance payout, and/or in determining whether an insurance term and/or policy period has expired. According to some embodiments, one or more insurance term descriptions may be communicated to a user (e.g., displayed in a menu format at a display device) so that the user can select one or more of the offered insurance terms to assemble a desired insurance policy.

For each insurance term, the insurance term database 250 may also store a premium cost 630 associated with the corresponding insurance term (e.g., for use in determining a total premium for a gambling loss insurance policy). In one or more embodiments the premium cost 630 may comprise an indication of the monetary amount of the premium associated with that insurance term. In other embodiments, the premium cost 630 may comprise a number of game credits (e.g., coins) associated with the insurance term. As indicated in tabular representation 600, some insurance terms (e.g., those indicating a preferred method of payment or a preferred means of communicating with the policyholder) may not have an associated premium cost (e.g., the entry for TERM-201" indicates a premium cost is not applicable ("N/A")).

Not all of the fields depicted in FIG. 6 are required, and various substitutions, deletions and other changes to the tabular representation will be readily apparent to those of ordinary skill in the art. For example, the premium cost is not needed in many embodiments, or may be included as part of the insurance term description. The depicted fields, for example, the insurance term descriptions, are for illustration only. Various other forms of insurance terms are described herein and still others will be readily apparent to those of skill in the art.

Referring now to FIG. 7, an exemplary tabular representation 700 illustrates an exemplary embodiment of insurance policy database 255 (FIG. 2) that may be stored, for example, in network server 200. The tabular representation 700 of the insurance policy database includes a number of example records or entries, each defining an insurance policy that is associated with a player. For example, each insurance policy may comprise one or more insurance terms defined in insurance term database 250. Those skilled in the art will understand that the insurance policy database may include any number of entries.

The tabular representation 700 also defines fields for each of the entries or records. The fields specify: (i) an insurance policy identifier 710 that uniquely identifies an insurance policy, (ii) a player identifier 720 that identifies a player (or players) associated with the insurance policy (e.g., a policyholder; a policy beneficiary), (iii) term identifiers 730, 740, 750 that each identifies (if applicable) a respective insurance term associated with the insurance policy, (iv) a total premium 760 associated with the insurance policy, and (v) a total amount of coverage 770 provided in accordance with the associated terms of the insurance policy.

The information in the insurance policy database 255 may be created and/or updated, for example, based on information received from a player, a casino employee, a gaming machine 104, a slot machine 300, a kiosk 400, and/or an input device 408. For example, an insurance policy record may be created by a casino server after a user at a kiosk agrees to purchase an insurance policy. In another example, information associated with an insurance policy may be updated by a server storing the insurance policy database if a user decides to change, add, or delete one or more terms of the policy (e.g., using a kiosk).

The insurance policy identifier 710 may be, for example, a numeric, alphanumeric, or other type of code associated with an insurance policy. The insurance policy identifier 710 is preferably unique, and may be generated or selected, for example, by a server or terminal. For each insurance policy, the insurance policy database 255 preferably stores one or more player identifiers 720 that identify a player (or players) associated with the corresponding insurance policy. According to some embodiments of the present invention, player identifier 720 identifies one or more players or users whose gambling activity is covered by the gambling loss insurance policy, who paid for the insurance policy, and/or who is a beneficiary of the gambling loss insurance policy. In this way, a player (or other user) who is entitled to an insurance payment under the insurance policy defined by the insurance policy record may be identified.

For each insurance policy, the insurance policy database 255 may also store an indication of one or more term identifiers 730, 740, 750. Each term identifier 730, 740, 750 identifies an insurance term of the corresponding insurance policy. For example, the term identifiers 730, 740, 750 may include a description of an insurance term or may comprise term identifiers corresponding to entries in a database (e.g., insurance terms database 255). Although only three term identifiers are illustrated in tabular representation 700, it will be readily apparent to those having ordinary skill in the art that an insurance policy may have any number of terms. Accordingly, any number of term identifiers may be provided in insurance policy database 255.

In one example depicted in tabular representation 700, term identifier 1730 of insurance policy "POL-1234" indicates "TERM-001," which refers to the insurance term "TERM-001" of tabular representation 600 of insurance term database 250 (FIG. 6). Insurance policy "POL-1234" also includes "TERM-202", as indicated by term identifier 2740. According to the exemplary data depicted in tabular representation 500 (FIG. 5), tabular representation 600 (FIG. 6) and tabular representation 700, insurance policy "POL-1234" thus provides insurance coverage for player "PL-246" ("Joe Smith") according to two terms: (i) a refund of 100% of net losses (up to $100) for the first thirty minutes of game play on any $1.00 slot machine, and (ii) as insurance payment, currency or a voucher will be provided to the policyholder at his machine via the machine or by a member of the casino staff.

The insurance policy database 255 may also store an indication of the total premium cost 760 associated with the insurance policy. According to one or more embodiments, the total premium cost 760 comprises an indication of the total monetary amount of all of the individual premium costs associated with the insurance terms that make up the insurance policy. According to the example data referred to above, insurance policy "POL-1234" has a total premium cost of $79.00 based on "TERM-001" ($79.00) and "TERM-202" ("N/A"), as indicated by tabular representation 600 (FIG. 6). In other embodiments, the total premium cost may comprise a total cost of the insurance policy in terms of a number of game credits (e.g., coins).

The insurance policy database 255 may also store an indication of the total amount of coverage 770 provided by the corresponding insurance policy. The total amount of coverage 770 thus indicates a total amount of exposure for the insuring entity for a particular insurance policy (e.g., the maximum total amount of insurance payment to which a policyholder may be entitled). According to one or more embodiments, the total amount of coverage 770 comprises an indication of the total monetary loss amount that may be covered in accordance with all of the terms of the insurance policy.

For example, according to the exemplary data of tabular representation 600 (FIG. 6) and tabular representation 700, insurance policy "POL-1234" has a total amount of coverage 770 of "$100.00 MAX" based on "TERM-001" ("100% of net losses (up to $100)") and "TERM-202" (no coverage provided). In other embodiments, the total amount of coverage may comprise a total number of game credits (e.g., coins) covered by the insurance policy.

Not all of the fields depicted in FIG. 7 are required, and various substitutions, deletions and other changes to the tabular representation will be readily apparent to those of ordinary skill in the art. For example, the total premium cost is not needed in many embodiments. Some embodiments may provide for an indication of an amount of the total premium paid and/or yet owed by the policyholder. The depicted fields, for example, the term identifiers, are for illustration only. Various other forms of insurance terms are described herein and still others will be readily apparent to those of skill in the art. In one or more embodiments, the insurance policy database 255 may include an indication of the insurance term descriptions in addition to or in lieu of insurance term identifiers. For example, the term identifiers may comprise a description of the insurance term.

Referring now to FIG. 8, an exemplary tabular representation 800 illustrates an exemplary embodiment of gambling session database 260 (FIG. 2) that may be stored, for example, in network server 200. The tabular representation 800 of the gambling session database includes a number of example records or entries, each defining a gambling session that is associated with a player. Those skilled in the art will understand that the gambling session database may include any number of entries.

The tabular representation 800 also defines fields for each of the entries or records. The fields specify: (i) a player identifier 810 that identifies a player associated with a gambling session, (ii) a gambling session identifier 820 that uniquely identifies a gambling session, (iii) an amount wagered 830 associated with the gambling session, (iv) an amount paid out 840 associated with the gambling session, (v) a player net win/(loss) 850 associated with the gambling session, (vi) a session start time/date 860 that includes an indication of a time that the gambling session started, and (vii) a session end time/date 870 that includes an indication of a time that the gambling session ended (if applicable).

The information in the gambling session database 260 may be created and/or updated, for example, based on information received from a player, a casino employee, a gaming machine 104, a slot machine 300, a kiosk 400, and/or an input device 408. For example, a gambling session record may be created by a casino server after receiving an indication that a player has started gambling at a slot machine (e.g., in which the player is identified by a player tracking card inserted at the slot machine), or a gambling session record may be modified by a gaming machine based on a player's gambling activity at the gaming machine.

For each gambling session, the gambling session database 260 preferably stores a player identifier 810 that identifies a player associated with the corresponding gambling session. In this way, information about the player's gambling activity (e.g., an amount lost by the player) may be stored and accessed as necessary, for example, for use in determining whether or not a given gambling session meets any of the terms of an insurance policy associated with the player. Based on information about the gambling session, therefore, a determination may be made as to whether the player is entitled to an insurance payment in accordance with the insurance policy.

The gambling session identifier 820 may be, for example, a numeric, alphanumeric, or other type of code associated with a gambling session. The gambling session identifier 810 is preferably unique, and may be generated or selected, for example, by a server or terminal. According to some embodiments, the session identifier 820 may comprise an indication of the type of gambling activity (e.g., a type of game; a type of machine played) encompassed by the gambling session. For example, as depicted in tabular representation 800, session "SES-SM-7108" may refer to gambling activity by player "PL-902" at a slot machine, while session "SES-BJ-4678" may refer to gambling by the same player "PL-902" at Blackjack (e.g., at video blackjack machine; at a Blackjack table).

For each gambling session, the gambling session database 260 may store an indication of an amount wagered 830 during the gambling session, an amount paid out 840 during the gambling session, and a player net win/(loss) 850. A loss is indicated in parentheses in the tabular representation 800.

According to some embodiments, amount wagered 830 may comprise the total amount wagered during the course of a gambling session and/or an average amount wagered during the gambling session (e.g., per handle pull). Where the amount wagered 830 represents an average amount wagered per play, the gambling session database 260 may further comprise a field having information for defining the total number of plays occurring during the gambling session (e.g., the total number of handle pulls). Thus, the total amount wagered within a given session may be determined as necessary: (Average wager per play)×(Total number of plays)=Total amount wagered.

Amount paid out 840 indicates a total amount of money (or credit) paid or designated to the player (e.g., gross winnings) for the gambling session. According to some embodiments, the player net win/(loss) 850 may be determined based on the amount paid out 840 and the amount wagered 830. In one example, according to exemplary data in tabular representation 800, player "PL-246" has wagered a total of $241.00 during gambling session "SES-6823" and $182.00 has been paid out, making a net loss of ($59.00) for the gambling session.

One or more terms associated with an insurance policy may be based on an amount wagered, an average amount wagered per play, an average loss per play, an average loss per a predetermined period of time, an amount paid out and/or a net loss (or net win). Accordingly, the amount wagered 830, amount paid out 840 and/or player net win/(loss) 850 may be used in determining whether or not activity of a gambling session is covered by an insurance policy, whether or not an insurance payment should be provided to a policyholder and/or the appropriate amount of any such insurance payment.

The gambling session database 260 may also store an indication of a session start time/date 860 and a session end time/date 870. In one example, according to exemplary data in tabular representation 800, gambling session "SES-6823" began at 14:33 on Jul. 3, 2004 and ended at 15:03 on Jul. 3, 2004. Those of ordinary skill in the art will understand that the starting and/or ending time of a gambling session may represented by an indication of a time, a date, or a combination thereof.

As described above, one or more terms associated with an insurance policy may be based on a period of time. For example, a coverage period may be defined by an insurance term (e.g., some portion of net losses during the first thirty minutes of game play are covered). Accordingly, the session start time/date 860 and the session end time/date 870 may be useful in determining whether or not a gambling session is covered by an insurance policy, whether or not an insurance payment should be provided to a policyholder and/or the appropriate amount of any such insurance payment.

A gambling session of a player generally represents some (or all) gambling activity of the player. None, some, or all of the gambling activity represented by an entry in gambling session database 260 may be covered by a gambling loss insurance policy and/or may result in an insurance payout being provided to a player. A gambling session may be defined in various ways, including, without limitation: (i) a number of plays of one or more types of games (e.g., a number of handle pulls of a slot machine; a number of hands dealt in a card game; a number of plays since a player inserted a player tracking card or otherwise identified himself; a number of plays since a player established an insurance policy), (ii) a period of time (e.g., a calendar day; a two-hour period; a weekend; a calendar year; a hotel visit; a period of time since a player inserted a player tracking card or otherwise identified himself; a period of time since a player established an insurance policy), (iii) an amount wagered (e.g., a total coin-in), and (iv) any combination of thereof.

Also, a gambling session may refer to gambling activity that is: (i) not continuous (e.g., may encompass two separate visits to a casino that are months apart), (ii) is interrupted by any amount of time (e.g., encompasses gambling by a player before and after a dinner break), (iii) comprises one or more types of games (e.g., includes play of video poker and slot machines), (iv) comprises activity at one or more gaming machines, (v) comprises some but not all gambling activity during a given period of time (e.g., comprises gambling during a first day and a third day of a casino visit, but not activity on the second day; comprises every other handle pull at a slot machine), and/or (vi) any combination thereof. Other definitions of gambling sessions or means for describing gambling activity may be described herein, and others will be readily apparent to those of skill in the art.

In one example of how a gambling session may be defined, a player inserts a player tracking card at a slot machine. This identification indicates the beginning of a gaming session, and a corresponding record is created in gambling session database 260 with a session start time/date 860 as of the time the player tracking card was received. Alternatively, the start of the gaming session may be indicated by the first wager and/or the first handle pull. Over the course of the next sixty minutes, the player wagers $1.00 each on one hundred reel spins (e.g., one hundred handle pulls), for a total wager amount of $100. The player then removes his player tracking card, ending the gaming session. The game session entry is updated with a session end time/date 870 as of the time the player tracking card was removed.

In the above example, the player's gambling session may be defined (at any given time) by the amount wagered since inserting the tracking card, by the amount the slot machine has paid out to the player, by the player's net win/(loss), by the number of handle pulls, and/or by the elapsed time since inserting the tracking card (e.g., as indicated by session start time/date 860 and session end time/date 870). Alternatively, the player's gambling activity could be defined as two or more gambling sessions, for example, based on each thirty minutes of play, or based on each set of twenty-five handle pulls.

In another example, the player gambles as described above, but the removal of the player tracking card does not necessarily define an end of the player's gambling session (e.g., the session end time/date 870 is still to be determined ("TBD")). For instance, the day after removing his player tracking card from the slot machine, the player inserts his player tracking card at a video poker machine. Over the course of the next thirty minutes, the player wagers $2.00 each on twenty initial deals (e.g., twenty starting poker hands), for a total wager amount of $40. The player then removes his player tracking card. After breaking for lunch, the player inserts his player tracking card at a video blackjack machine. In this second example, one or more gambling sessions may be defined by some or all of the activity at the slot machine, the video poker machine and/or the video blackjack machine during the two days described.

According to some embodiments of the present invention, for policies having insurance coverage during a determined period of play, the player may be required (e.g., per an insurance term of an insurance policy) to make at least a minimum total wager amount and/or at least a minimum number of plays, in order to deter the player from playing slowly during the insured period. Alternatively or in addition, a player may be required not to exceed a maximum total wager amount, a maximum number of plays and/or a maximum rate of play so that the player does not play recklessly during the period of coverage.

Not all of the fields depicted in FIG. 8 are required, and various substitutions, deletions and other changes to the tabular representation will be readily apparent to those of ordinary skill in the art. For example, the amount paid out is not needed in many embodiments. The depicted fields, for example, the amount wagered, are for illustration only. Various other forms of session identifiers will be readily apparent to those of skill in the art. Some embodiments of the present invention may provide for an indication of a total number of plays (e.g., handle pulls) of the gambling session, which may be used in administering an insurance policy (e.g., in which the policy covers only a given number of handle pulls).

Referring now to FIG. 9, an exemplary tabular representation 900 illustrates an exemplary embodiment of insurance policy status database 265 (FIG. 2) that may be stored, for example, in network server 200. The tabular representation 900 of the insurance policy status database includes a number of example records or entries, each defining status information of an insurance policy that is associated with a player. Those skilled in the art will understand that the insurance policy status database may include any number of entries.

The tabular representation 900 also defines fields for each of the entries or records. The fields specify: (i) an insurance policy identifier 910 that identifies an insurance policy, (ii) a policy status 920 that indicates a status of the insurance policy, (iii) player qualified for insurance payout? 930 that includes an indication of whether a player is qualified for an insurance payout under the corresponding insurance policy, (iv) insurance payout amounts 940, 950 that include an indication of an amount paid out in accordance with the insurance policy, (v) an insurance payout method 960 that includes an indication of how an insurance payout is to be or has been provided, and (vi) an insurance payout time/date 970 of the insurance payout, if any.

The information in the insurance policy status database 265 may be created and/or updated, for example, based on information received from a player, a casino employee, a gaming machine 104, a slot machine 300, a kiosk 400, and/or an input device 408. For example, an insurance policy status record may be created by a casino server after an insurance policy is established for a player. In another example, status information associated with an insurance policy may be updated by a server, based on game information received from a gaming machine and/or stored in a database, such as in a gambling session database. For instance, a player at a slot machine experiences a gambling loss that is covered by an insurance policy. The slot machine transmits information about the player's gambling activity to the server and the server stores the game information in a gambling session database. Based on the information in the gambling session database, the server then updates an insurance policy status database to indicate the player is qualified for an insurance payout and/or the insurance payout amount.

The insurance policy identifier 910 may be, for example, a numeric, alphanumeric, or other type of code associated with an insurance policy. The insurance policy identifier 910 may be generated or selected, for example, by a server or terminal, and may correspond to an entry in insurance policy database 255. For each insurance policy status entry, the insurance policy status database 265 preferably stores a policy status 920 that indicates the present status of the insurance policy. For example, the policy status 920 may comprise an indication of whether the insurance policy is active, open, paid, paid-in-part, paid-in-full, inactive, cancelled, closed, expired, or any combination thereof.

In some exemplary embodiments, an exemplary insurance policy status of "open" may indicate that no gambling session associated with the insurance policy has yet occurred, or may indicate that an associated gambling session is underway. An exemplary status of "closed" may indicate that the corresponding insurance policy may be associated with one or more completed gambling sessions that did not qualify the player for an insurance payout. An exemplary status of "paid" may be used to indicate that the corresponding insurance policy is associated with a player who was eligible for an insurance payout, and the insurance payout has been determined and/or provided to the player. Other types of statuses will be readily apparent to those of ordinary skill in the art.

For each record, the insurance policy status database 265 may also store an indication of whether the player is qualified for an insurance payout 930 (e.g., based on the terms of the corresponding insurance policy and/or a gambling session of the player). According to some embodiments, this determination may be made by comparing information in the gambling session database 260 to information in the insurance policy database 255 and/or insurance term database 250. For example, an insurance term of the corresponding insurance policy may indicate that the player is entitled to an insurance payout if his net winnings are below a certain threshold (e.g., the player's net winnings are less than $100).

The insurance policy status database 265 may also store an indication of any insurance payout amounts 940, 950 that have been or are to be provided to a policyholder (or other beneficiary) in accordance with a gambling loss insurance policy. The amount indicated may be determined based on one or more of the corresponding insurance policy terms and/or information about a gambling session covered by the insurance policy, such as the information stored in gambling session database 260. For example, a player's net losses for a gambling session may be determined based on the player net win/(loss) 850 of gambling session database 260, and the insurance payout amount 940 may indicate an amount that is a percentage of the player net win/(loss) 850 in accordance with one or more terms of the insurance policy (e.g., 50% of net losses are covered).

Referring to exemplary tabular representation 900, exemplary policy "POL-1224" is depicted as having a status of "PAID" and insurance payout amount 1940 indicates that the player has or will receive an insurance payout amount of $38.27 based on his gambling activity. Insurance payout amount N 950 indicates that a second payout amount is to be determined ("TBD"). This information may indicate, for example, that the policy "POL-1224" has not yet expired. Accordingly, further gambling activity by the corresponding player may be covered, and the player may receive another insurance payout. For example, one term of the policy "POL-1224" may cover a number of plays of video poker, but the player has not yet played video poker.

The insurance policy status database 265 may also store an indication of an insurance payout method 960, which indicates the manner in which an insurance payout (if any) is to be or has been conveyed to a qualified player. According to some embodiments, insurance payout method 960 may be based on one or more terms of the insurance policy (e.g., "TERM-201" of exemplary tabular representation 600 of insurance terms database 250 indicates that an insurance payment will be posted to a major credit card). The insurance policy status database 265 may also store an indication of an insurance payout time/date 970 that an insurance payout (if any) was provided to a player (or other beneficiary of the insurance policy). In some embodiments, more than one time may be stored, for example, if multiple insurance payouts have been provided.

Not all of the fields depicted in FIG. 9 are required, and various substitutions, deletions and other changes to the tabular representation will be readily apparent to those of ordinary skill in the art. For example, the insurance payout time/date 970 is not needed in many embodiments. The depicted fields, for example, the insurance payout amounts, are for illustration only. Various other forms of insurance policy status information are described herein and still others will be readily apparent to those of skill in the art. In one or more embodiments, some or all of the information described herein with respect to the insurance policy status database 265 may be included in a database storing other information related to an insurance policy (e.g., insurance policy database 255). In one or more embodiments, the insurance policy status database may include more than one record corresponding to a given gambling loss insurance policy (e.g., a respective record for each insurance payout that has been provided in accordance with the policy). In some alternative embodiments, each of insurance payout amounts 940, 950 may be indicated by a field comprising an indication of the total monetary amount of all of the insurance payouts provided in accordance with the gambling loss insurance policy.

3. Processes

Figure 10A:
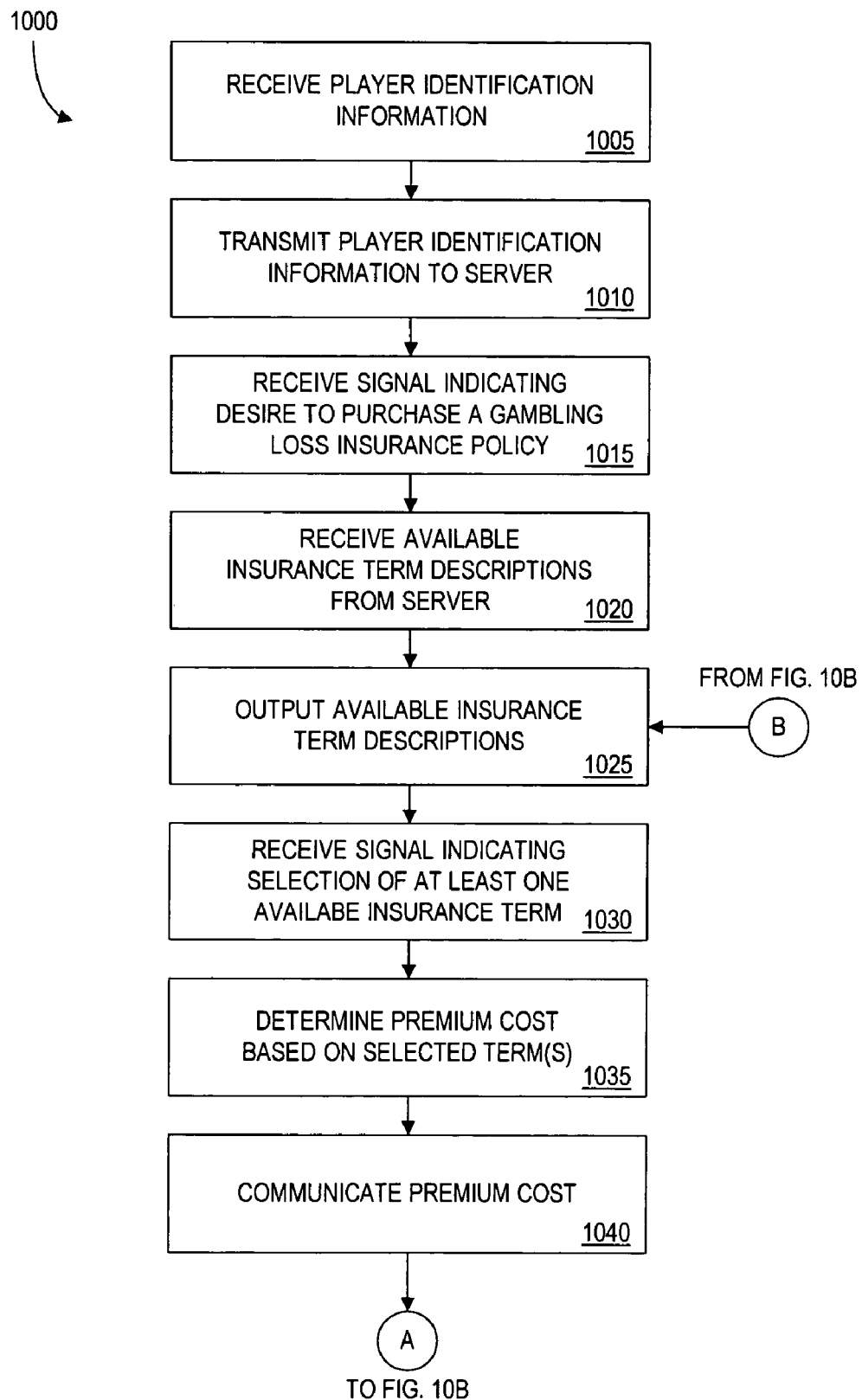
FIGS. 10A and 10B are a flowchart illustrating a process according to one or more embodiments of the present invention for offering a gambling loss insurance policy.
Figure 10B:
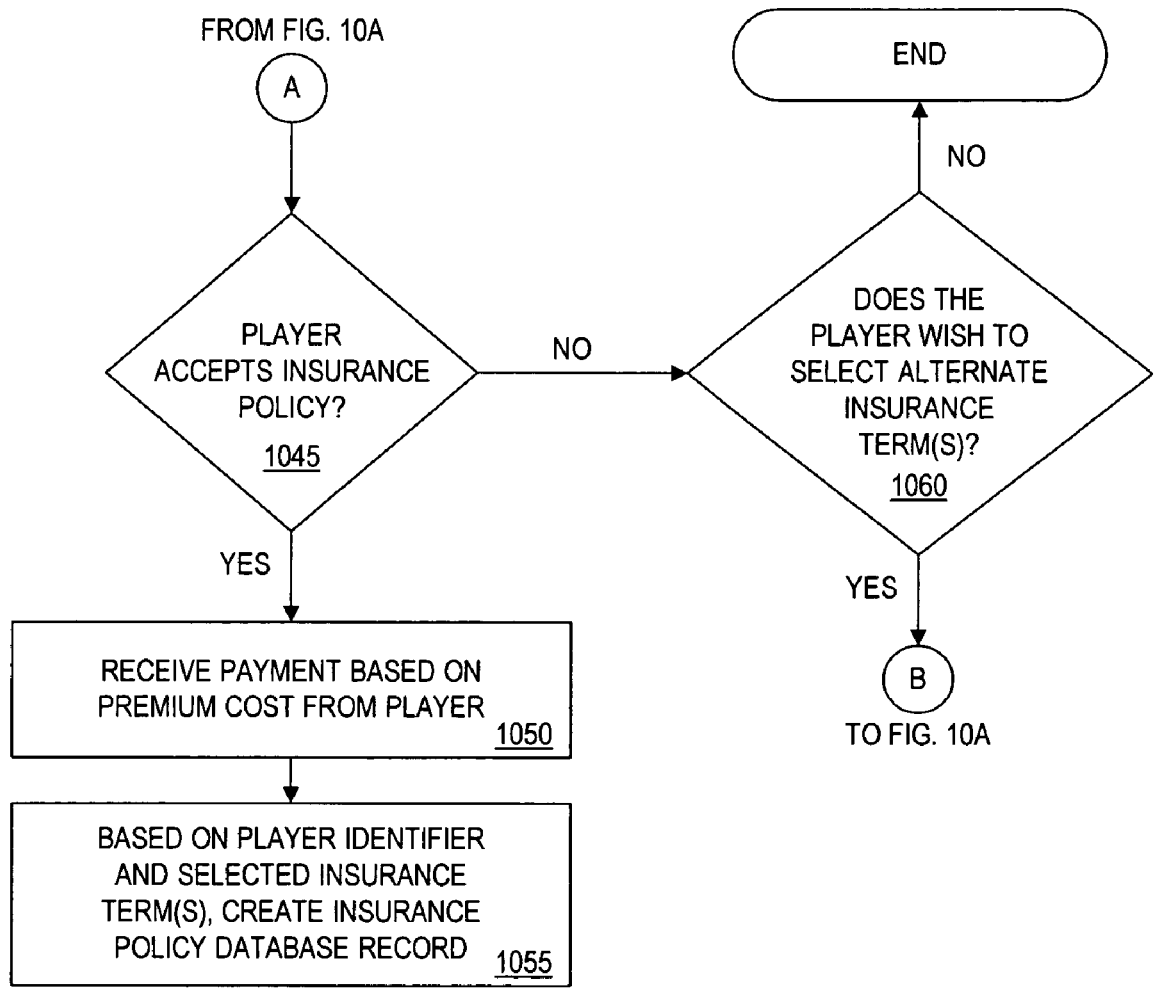

Referring to FIGS. 10A-10B, a flow chart 1000 represents one or more embodiments of the present invention that may be performed by a casino employee, a server and/or a terminal, including, without limitation, a gaming machine or kiosk. The process 1000 is a method for offering a gambling loss insurance policy to a player. The particular arrangement of elements in the flow chart of FIGS. 10A-10B, as well as the other flow charts discussed herein, is not meant to imply a fixed order to the steps; the steps can be practiced in any order that is practicable for various embodiments of the present invention. For illustrative purposes only, the process 1000 is described as being performed by a terminal operated by a casino employee (e.g., at a slot club registration location). The employee terminal is in communication with a server acting as a casino server (e.g., via a LAN). Of course, the process 1000 may be modified as practicable for any type of terminal (e.g., personal computer; gaming machine; video poker machine) and/or server.

A terminal in communication with a server (e.g., a casino server) receives information that identifies a player (step 1005). For example, a player wishing to join the casino's slot club approaches the slot club host and requests to be registered with the slot club. The slot club host takes the player's name and address and enters the information into the terminal using a keyboard.

In an alternative embodiment, a player or other user approaches a kiosk on a casino floor and inputs his player tracking card at a card reader device of the kiosk. The kiosk reads the user's player identifier (e.g., "PL-246") from the player tracking card. In another alternative embodiment, a user visits a Web page form hosted by the server using a personal computer in communication with the server via the Internet and inputs his user identifier (e.g., user tracking card number), name and/or address using a keyboard of the personal computer.

The terminal transmits the user identifier information to the server (step 1010). For example, the terminal transmits the information in response to the operator using a pointer device to click on a "Submit" button represented on a Web page form.

The terminal receives a signal that indicates a desire by the player to purchase a gambling loss insurance policy (step 1015). According to one or more embodiments, the slot club host (or player) provides input to the terminal that indicates a desire by the player to accept an offer for insurance and/or to receive additional information about a gambling loss insurance policy or purchasing such a policy. For example, the slot club host may indicate to the player that gambling loss insurance is available, and asks if the player would like to purchase insurance or would like to learn more about the insurance program. If the player says "Yes", the slot club host may signal the player's desire to purchase a gambling loss insurance policy by, for example, clicking a checkbox on the player's slot club registration form, or touching a location of the terminal's display device (e.g., a selectable "button") that indicates the player would like to purchase gambling loss insurance.

In another example, the server may transmit one or more offers for a gambling loss insurance policy to the terminal for display to the slot club host and/or player. For instance, in a manner well-known in the art, a "pop-up" advertisement may be displayed at the slot club terminal in a window of a browser application. The slot club host may then describe the offer and/or show the advertisement to the player. The advertisement may include a hyperlink that the slot club host may click (e.g., using a pointer device) to indicate a request by the player to purchase a gambling loss insurance policy. In some alternative embodiments, a player is playing Blackjack at a video blackjack machine, and a representation of a "Purchase Insurance" button (or hyperlink) is displayed to the player during play of the game. The player may click on the button to indicate a desire to purchase a gambling loss insurance policy.

The terminal receives a signal from the server that includes descriptions of one or more available insurance terms (step 1020). According to some embodiments, the terminal receives the information from the server after (or in response to) transmitting the signal indicating the player's desire or request to purchase a gambling loss insurance policy, as described above (step 1015). According to one or more embodiments, the server may transmit information about one or more insurance terms stored in exemplary insurance terms database 250 (e.g., "TERM-001" depicted in exemplary tabular representation 600 may be represented by a signal comprising that indicates "Refund 100% of net losses (up to $100) for the first 30 minutes of game play on any $1.00 slot machine"). In some alternative embodiments, the terminal may also receive an indication of the respective cost of one or more of the insurance terms. For example, "TERM-001" of the tabular representation 600 has an associated premium cost of $79.00.

According to some embodiments, player information (e.g., as stored in the player database 245) associated with the player may be used by the server to determine one or more available insurance terms. For example, the server may use the lifetime win/(loss) 550 associated with a player (FIG. 5) to select one or more terms having an appropriate wager per play (or range of wagers per play). According to some other embodiments, if a player is at a gaming machine, for example, the available insurance terms may be determined based on information about the gaming machine. For example, the available insurance terms may be based on the type of gaming machine, the denomination of the gaming machine, and/or the standard deviation of payouts by the gaming machine.

The terminal outputs or otherwise communicates the descriptions of the available insurance terms (step 1025). For example, the terminal communicates one or more descriptions to the operator and/or the player using one or more devices described above with respect to kiosk 400 (e.g., by displaying at a display device or outputting one or more descriptions using an audio speaker). According to some embodiments, the terminal displays available insurance term descriptions in a menu of selectable items, in a manner well known in the art.

The terminal also receives a signal indicating a selection by the player of at least one of the available insurance terms (step 1030). For example, the slot club host may describe the available insurance terms (e.g., by reading the descriptions from a display device of the terminal). Once the player has made his selections (e.g., by telling the slot club host which of the available terms he would like), the slot club host may select one or more items from a list of available insurance terms using a pointer device, or by touching a touch screen. Alternatively, the player may be allowed to make his own selections at the terminal. According to some embodiments, the terminal receives the selections after (or in response to) communicating the available insurance term descriptions, as described above (step 1025).

Based on the one or more selected insurance terms, the terminal determines a premium cost for an insurance policy including the selected insurance terms (step 1035) and communicates the determined premium cost (step 1040). For example, the terminal displays the determined premium cost to the slot club host so that the host may inform the player. In another example, the terminal prints out a statement that includes an indication of the premium cost. According to some embodiments, the communication of the premium cost comprises an offer for a gambling loss insurance policy (e.g., including the selected insurance terms) in exchange for the determined premium cost.

As described above, in one or more embodiments, the determined premium cost is a total sum of the respective premium costs of the selected insurance terms. According to other embodiments, the determined premium cost may be more than or less than the total sum of the respective premium costs. For example, a casino may offer an insurance policy including two or more insurance terms at a savings or discount to the player. As will be readily apparent to those having ordinary skill in the art, policies or other combinations of terms may thus be advertised or offered to players at a discounted premium cost (e.g., "If you buy coverage for video poker and slot machine play, we'll discount the cost of the slot machine coverage by 10%.").

According to some embodiments, the terminal transmits an indication of the selected insurance terms to the server, which determines an appropriate total premium cost and transmits an indication of the total premium cost to the terminal. According to other embodiments, the terminal may determine the total premium cost without transmitting an indication of the selected insurance terms to the server or without receiving an indication of the total premium cost from the server. For example, the server may transmit to the terminal an indication of the respective premium cost for each available insurance term (e.g., when it transmits descriptions of the available insurance terms), which may be stored, by the terminal. Accordingly, the terminal can determine a total premium cost based on the selected insurance terms without additional communication with the server.

According to some embodiments, player information (e.g., as stored in the player database 245) associated with the player may be used in determining the premium cost. For example, the lifetime win/(loss) 550 associated with a player (FIG. 5) may be used to estimate the volatility or risk of a player's gaming activity, and the premium cost may be based at least in part on this estimation in determining an appropriate premium for a gambling loss insurance policy. In some embodiments, two players purchasing insurance policies having the same terms may be charged different premium costs. For example, a "high risk" player with a lifetime loss greater than a predetermined threshold may be charged an appropriately higher premium than a "low risk" player. In another example, the lifetime win/(loss) 550 associated with a player may be used to estimate the skill of the player. For instance, a video poker player may be rated according to an estimation of his skill. A first video poker player that is rated higher than a second video poker player may be charged an appropriately lower premium cost than the second player, because the first video poker player is less likely to lose as much as the second player. According to some embodiments, a player may be refused insurance coverage based at least in part on the player's lifetime win/loss 550.

In another example, the average wager per play 560 (FIG. 5) may be used in determining an available insurance term (e.g., a wager amount to cover) or a premium to offer to a player for a gambling loss insurance policy. For example, a player who wagers $1.00 per play on average but requests coverage for $3.00 per play may be charged an appropriately high premium based on an assessment that the player is planning to engage in riskier gambling behavior than usual. In some embodiments, based on the player's average wager per play (or per session), the network server 200 or kiosk 400 may offer coverage for a different wager amount than was initially selected or indicated by the player. For example, a player who typically wagers $2.00 per play requests coverage for $3.00 per play. Based on the player's average wager per play, the terminal determines a counteroffer for $2.00 per play and provides the offer to the player. In some embodiments, a player may be refused insurance coverage based at least in part on the player's average wager per play.

In yet another example, a player's average session length 570 (FIG. 5) may be used in generating an offer for a gambling insurance policy. For example, the average session length 570 may be used by server 102 in determining an available insurance term (e.g., a period of policy coverage) and/or in determining a premium to offer to a player for a gambling loss insurance policy. According to some embodiments, a player may be refused insurance coverage based at least in part on the player's average session length.

Referring to FIG. 10B, the terminal determines whether the user accepts the insurance policy (step 1045). In some embodiments, the terminal receives a signal from a user (e.g., the slot club host; the player) indicating that the player is willing to pay the determined premium cost in exchange for receiving insurance coverage in accordance with the selected insurance terms. For example, the user may click on a virtual button (or a hyperlink) on a Web page (e.g., a button labeled "Accept Policy"). According to one or more alternative embodiments, determining whether the player accepts the insurance policy comprises receiving an indication of payment of at least a portion of the premium cost by the player (e.g., an indication of a payment amount that is less than or equal to the premium cost).

If the player accepts the insurance policy, the terminal preferably receives payment based on the premium cost from the player (step 1050). For example, the terminal may receive a financial account identifier such as, without limitation, a credit card number. For instance, the player may provide his credit card number to the slot club host so that the host can enter the credit card number into the terminal (e.g., via a keypad; via a credit card reader). In another example, the terminal may receive bills and/or coins in a manner well known in the art (e.g., at a cash drawer). According to one or more embodiments, only a predetermined percentage of the premium cost or a predetermined amount (e.g., based on the premium cost) needs to be paid in order to accept the insurance policy.

Preferably, if the user accepts the insurance policy, an insurance policy record is created (step 1055). According to some preferred embodiments, the insurance policy record is stored at the server (e.g., in insurance policy database 255) based on the user identification information (e.g., player identifier) and the selected insurance terms that comprise the insurance policy. For example, tabular representation 700 illustrates an insurance policy identified as "PL-1234" that is associated with a player identified as "PL-246" and including terms "TERM-001" and "TERM-202". Storing the insurance policy information at a server provides the advantage that the insurance policy information may be accessed for administering insurance coverage at a plurality of gaming machines and kiosks in communication with the server. According to some embodiments, information corresponding to the accepted insurance policy may be stored at the terminal in addition to or in lieu of information stored at the server.

If, however, the user does not accept the insurance policy, the terminal determines whether the player wants to select one or more alternative insurance terms (step 1060). For example, the slot club host may ask the player if he is not interested in an insurance policy at all, or if he would prefer select a different set of one or more available terms. In some cases, the player may believe that the determined premium cost is too high, and may wish to assemble an insurance policy having a lower premium cost. If the player expresses a desire to select one or more alternate insurance terms, the host, for example, may press a button at the terminal that instructs the terminal to output a list of any available insurance terms. If it is determined that the player should be allowed to select one or more alternative insurance terms, the process continues by communicating (e.g., displaying or outputting) one or more available insurance terms to the user (step 1025). If, however, it is determined that the player does not wish to select alternative insurance terms (e.g., does not wish to purchase an insurance policy at all), the process ends.

According to some embodiments, the user is not limited in the number of times he may be allowed to re-select desired insurance terms. According to other embodiments, the user may be limited to a predetermined number of opportunities to select insurance terms (and/or to receive a premium quote for an insurance policy).

According to one or more embodiments of this invention, a player registers in advance, for example, at a cashier's station, and obtains a tracking card. The tracking card may be a magnetically coded tracking card generally used at casinos, a stored value card, or other form of smart card. In some preferred embodiments, only the player ID is stored on the player tracking card for security reasons. However, other types of information, such as monetary value, and/or an insurance policy identifier, can also be stored on the player tracking card. According to some embodiments, a card (e.g., an insurance card) may store one or more insurance policy identifiers, in which each insurance policy identifier identifies an insurance policy associated with the player. During registration, the player provides various types of player information, such as that shown in tabular representation 500 (FIG. 5) of the player database 245, including, without limitation, name, address, and credit card number. The casino assigns each player a unique numeric ID number. The player also provides preferred payment methods to define the preferred methods of receiving payouts under the policy, which will be described in detail below. Additionally, the system maintains an indication of whether the player has an insurance policy. For example, the system may create an entry in a database (e.g., insurance policy database 255) indicating that the player is associated with an insurance policy. The player registration, as well as the purchase of insurance as described below, may also take place at slot machine 300 or any game machine having an interactive interface.

Figure 11:
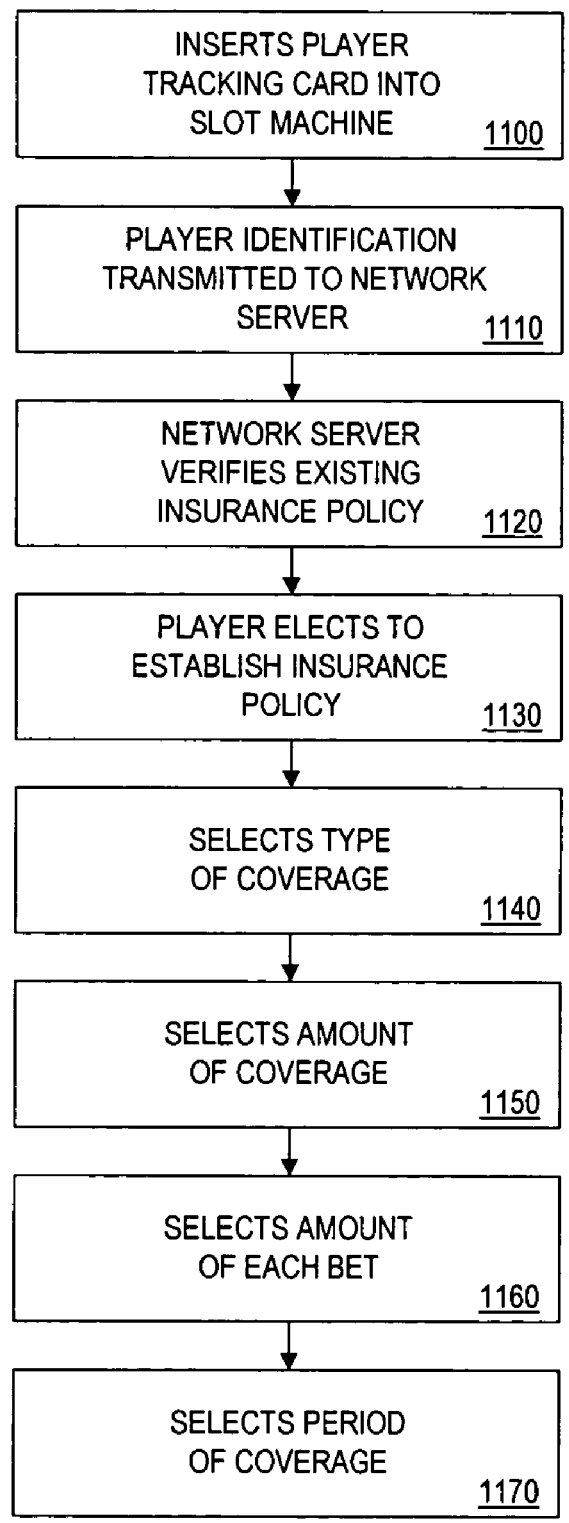
FIG. 11 is a flowchart illustrating a process according to one or more embodiments of the present invention for selecting policy requirements.

FIG. 11 illustrates a process consistent with some embodiments of this invention for purchasing gambling loss insurance. Initially, the player inserts the tracking card into slot machine 300 (step 1100). Card reader 332 of player card tracking device 330 reads the player ID stored on the player tracking card, and player card tracking device 330 transmits the player ID to network server 200 (step 1110). Network server 200 looks up the player ID number in the player database 245 and checks to see whether the player has an existing insurance policy (step 1120). If the player has an existing policy, the player may either initiate a gambling session under that policy or purchase another policy.

According to some alternative embodiments, slot machine 300 may check to see whether the player has an existing insurance policy without transmitting the player ID to network server 200. For example, slot machine 300 may include a player database.

Regardless of whether the player has a policy, display 331 presents to the player information giving the player an option to purchase new or additional gambling loss insurance, at which point the player may elect to establish an insurance policy (step 1130). Policy requirements may be established in various ways: entering data directly into a key pad attached to slot machine 300; entering data into a kiosk (e.g., a custom terminal on a casino floor); providing data to a cashier who enters the requirements directly into network server 200; or entering the data using a telephone, which then transmits the data to network server 200. Other ways for establishing policy requirements are discussed variously herein, and still other means will be readily apparent to those having ordinary skill in the art. For this embodiment, it will be assumed the insurance policy is purchased from slot machine 300.

Next, the player defines the type of coverage by establishing policy requirements (e.g., insurance terms) of the insurance policy (step 1140). The player determines, for example, the loss at which the insurance policy pays a claim, the amount of each bet, and/or the time period over which the insurance policy is in effect.

There are a number of ways in which the amount of coverage can be described (step 1150). For example, an insurance policy with a stated loss limit of five hundred dollars provides a payment to the player if his losses for the covered gambling session exceed five hundred dollars. The payment could be made if losses exceed five hundred dollars at any time throughout the session, or only if losses exceed five hundred dollars at the conclusion of the covered gambling session. Alternatively, a graduated insurance payout scale could allow for insurance payouts to increase as the size of the loss increases. Rather than specifying an amount of loss, the insurance policy could instead describe a rate of loss, such as one hundred dollars per hour. Any insured gambling session in which losses exceeded one hundred dollars for a given one hour period would result in an insurance payout. Loss amounts could also represent a fraction of the amount of money gambled during the insured session. A forty percent loss limit, for example, would trigger an insurance payout when net losses for the session exceed forty percent of the total amount bet during the session.

The player next describes the amount of each bet over the insured period (step 1160). A slot machine player, for example, might indicate that he is playing a dollar machine and that he is playing three coins per handle pull. The player may also specify the type of slot machine that he is going to play in order to provide basic information about the standard deviation of the outcomes to the server.

After establishing an amount of loss to be covered, the player selects the coverage time of the policy (step 1170). For example, the insurance policy could specify a start and stop time. Any gambling within this time window is covered by the policy. Alternatively, the player could select a number of handle pulls so that the insurance period is based on activity rather than time. For example, the player may establish a policy to cover the next one thousand handle pulls.

In another example, the player may specify a particular time period, such as a number of days, weeks, months, or years. In another example, the player may specify a period of coverage that does not begin upon purchase of the policy. For instance, the player could purchase a policy in advance for a four-day period starting two weeks from the time of purchase. Thus, a player could establish an insurance policy for a return visit, for example. In some cases, when a guest makes a reservation for a hotel stay, the hotel may offer an insurance policy to cover all or a portion of the guest's stay.

In some embodiments of the present invention, the network server 200 and/or slot machine 300 may suggest one or more policy requirements to the user based on the user's gaming history and/or prior purchased policies. For example, the network server 200 may look up a player's average wager amount in a database (e.g., player database 245) and determine that the bet amount covered by the policy must be no more than (or within a predetermined range of) the average wager amount. In this way, players may be discouraged from purchasing insurance for atypical wager amounts.

Insurance payouts can take a number of different forms. They can be a fixed dollar amount, a fraction of all losses above the loss limit, a number of free plays on the machine, or any other of type of benefit, as practicable for the particular application. For example, an insurance benefit may be in the form a frequent flyer miles, comp points, discounts (e.g., room, food, or beverage comps) or coupons (e.g., for the casino or other merchant), show tickets, etc. According to some embodiments, a policyholder of a gambling loss insurance policy may be able to specify the form of insurance payout at the time of purchase, a time at which the insurance payout is provided, and/or at any other time.

An indication of such policy requirements may be stored, for example, as one or more entries in a database (e.g., insurance term database 250; insurance policy database 255). According to some embodiments, slot machine 300 transmits the policy requirements to network server 200 through communication port 385. Network server 200 then stores an indication of the player selected coverage type and the selected loss threshold in insurance policy database 255. According to some alternative embodiments, slot machine 300 stores the policy requirements, for example, in an insurance database at the slot machine 300.

Figure 12:
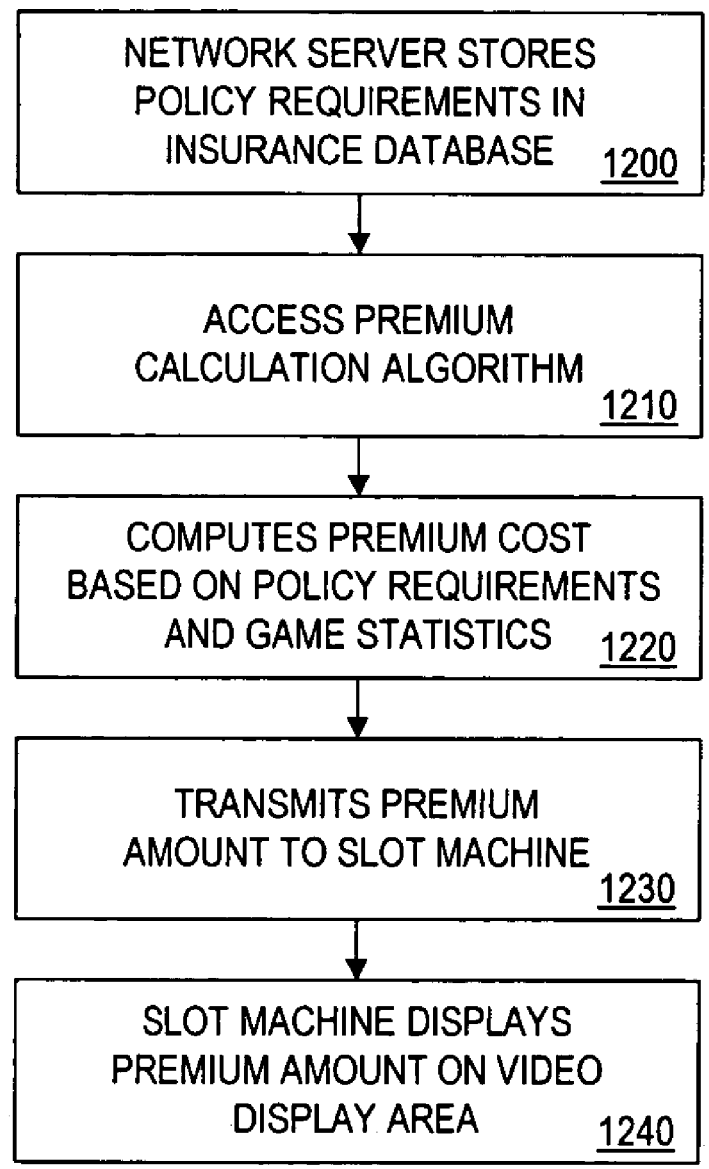
FIG. 12 is a flowchart illustrating a process according to one or more embodiments of the present invention for calculating an insurance premium.

FIG. 12 is a flowchart illustrating a process for calculating a premium cost consistent with various embodiments of this invention. First, network server 200 stores an indication of the policy requirements received from slot machine 300, along with the player ID, in insurance policy database 255 (step 1200). CPU 205 accesses a premium calculation algorithm pre-stored in storage device 240 (step 1210), and computes the premium costs based on the policy requirements (step 1220). Although many different algorithms may be used to calculate the premium costs, insurance policies having a high level of protection will generally require higher premiums. If all else is equal, the premium amount increases as the amount of the insurance payout increases. An insurance policy that pays fifty dollars for any loss greater than five hundred dollars over a one hour period will generally cost twice as much as a policy that pays twenty five dollars for the same loss profile.

Of course, the entity providing the insurance coverage may calculate or otherwise determine the premium cost in any manner practicable for the particular application.

As loss limits increase, the premium amount declines, reflecting the decreased probability that the player loss will trigger an insurance payout.

Greater gambling activity will of course necessitate relatively higher insurance premiums. A doubling of the time period of coverage, for example, will increase the premium amount (although not necessarily linearly). Higher bet amounts per handle pull will also typically result in higher premium amounts. Insurance policies written on machines with relatively high payout variance will also preferably require higher insurance premiums.

Once calculated, network server 200 transmits the premium cost to slot machine 300 (step 1230) which then displays the premium cost on display 331 or video display area 315 (step 1240).

According to some alternative embodiments of the present invention, some or all of the described steps for determining a premium amount may be carried out by the slot machine 300.

Figure 13:
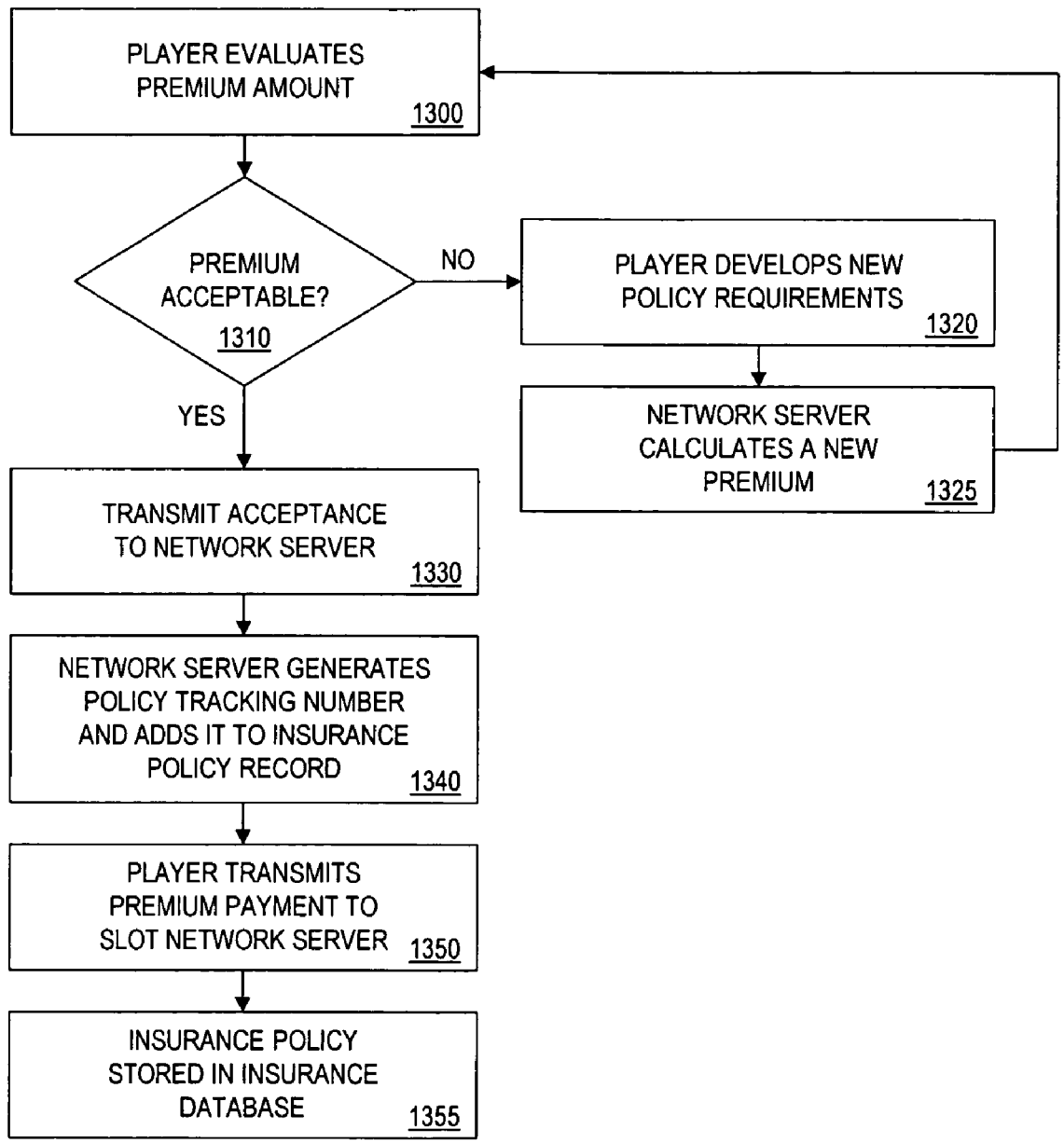
FIG. 13 is a flowchart illustrating a process according to one or more embodiments of the present invention for finalizing the purchase of the insurance policy.

FIG. 13 is a flowchart illustrating a process consistent with various embodiments of the invention for finalizing the purchase of an insurance policy. The player evaluates the premium cost shown on display 331 (or video display are 315) and decides whether the premium cost is acceptable (step 1300). If the premium is not acceptable to the player (step 1310), the player may develop new policy requirements (step 1320). For example, if the premium is too high, the player may increase the loss amount covered or may shorten the time period covered by the policy. Network server 200 then calculates a new premium cost based on the modified policy requirements (step 1325) (e.g., as described in connection with FIG. 7). This new premium amount is then transmitted to slot machine 300 for display to the player.

If the premium is acceptable to the player (step 1310), the player transmits an indication of his acceptance to network server 200, providing a confirmation to purchase the specified insurance policy (step 1330). Network server 200 preferably stores the premium amount in a database, such as in the total premium field 760 (FIG. 7) of the exemplary insurance policy database 255. Next, network server 200 generates a tracking number or other insurance policy identifier and appends it to the insurance policy record as shown in the tabular representation 700 (FIG. 7) (step 1340). Network server 200 receives the premium (or a predetermined portion thereof) from the player by directly debiting the player's credit card account, accepting coins deposited by the player, and/or debiting the player's winnings accrued at slot machine 300 (step 850). Once sufficient payment is received for the premium, network server 200 stores the insurance policy record in insurance policy database 255 (step 855).

According to one or more embodiments of the present invention, at this point, network server 200 may also create an entry in the insurance policy status database 265 and set policy status 920 (FIG. 9) to "open".

According to some alternative embodiments of the present invention, some or all of the described steps for finalizing a purchase may be carried out by the slot machine 300. For example, slot machine 300 may include an insurance database for tracking information about an insurance policy of a player.

Figure 14:
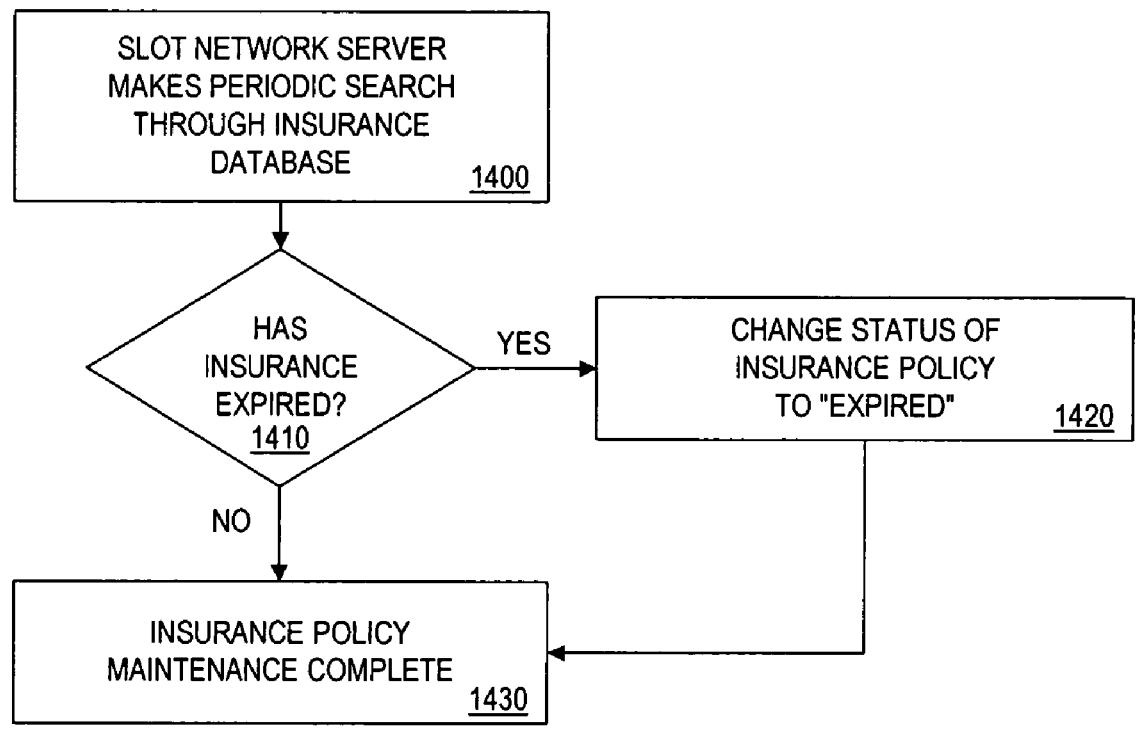
FIG. 14 is a flowchart illustrating a process according to one or more embodiments of the present invention for system maintenance of active insurance policies.

According to one or more embodiments of the present invention, network server 200 preferably performs maintenance checks to ensure that only active insurance policies are stored in the insurance policy database 255. FIG. 14 is a flowchart illustrating a preferred process for maintaining active insurance policies. First, network server 200 makes periodic searches through the insurance policy database 255, retrieving the coverage period of each insurance policy (step 1300). For example, for each entry in the insurance policy database 255, network server 200 may cross-reference the term identifiers 730, 740, 750 with the terms stored in the insurance term database 250 in order to determine the period covered by the insurance policy. CPU 205 checks whether the insurance has expired by comparing the coverage period with the current date and time (step 1310). If the current date and time are beyond the coverage period, network server 200 changes the policy status field 920 of the corresponding entry in the insurance policy status database 265 to indicate the policy is "closed" or "expired" (step 1320). For insurance policies with a period of coverage defined by a number of handle pulls, CPU 205 checks to see whether the number of outcomes received exceeds the amount of coverage. This completes the insurance policy maintenance (step 1330).

Figure 15:
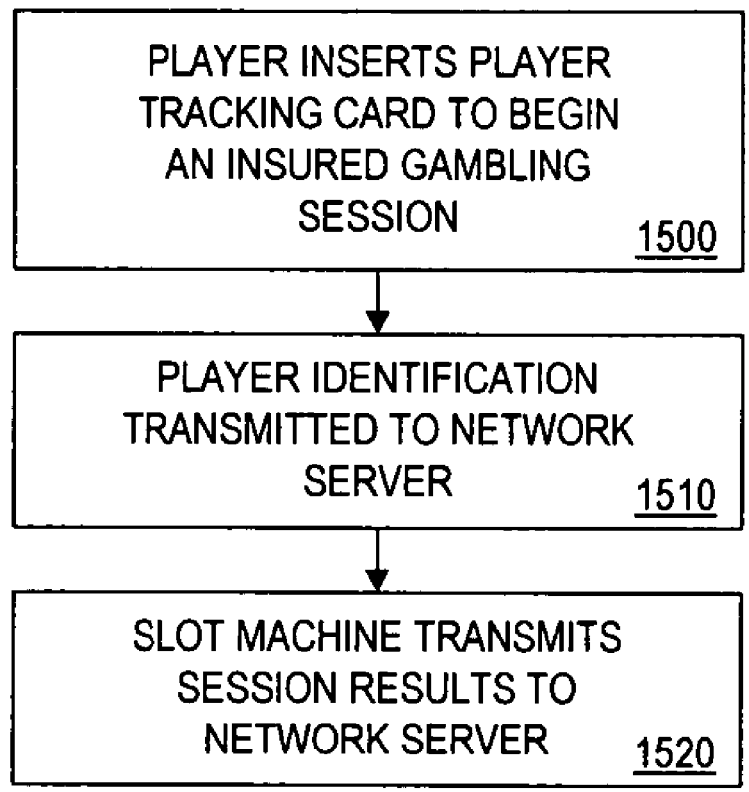
FIG. 15 is a flowchart illustrating a process according to one or more embodiments of the present invention for facilitating a gambling session.

Once an "open" or "active" insurance policy is stored in insurance policy database 255, the player may conduct an insured gambling session under the insurance policy as shown in the exemplary process depicted in FIG. 15. According to one or more embodiments of the present invention, to begin an insured gambling session, the player inserts the player tracking card into player card tracking device 330 of slot machine 300 (step 1500). Slot machine 300 then transmits the player ID number stored on (or otherwise indicated by) the player tracking card to network server 200 (step 1510). If network server 200 determines that the player has an active insurance policy in insurance policy database 255, CPU 205 of network server 200 starts storing the player's gaming results (e.g., in the gambling session database 260). Alternatively, network server 200 may store an indication of the player's gambling activity regardless of whether the player has an active policy or not.

According to some embodiments of the present invention, during a gaming session at slot machine 300, the player may choose to take a break and temporarily suspend the session without decreasing the coverage period. Additionally, the player is free to relocate to another machine, or to play a different game. To do so, the player simply selects a "Suspend" option (e.g., by pressing a corresponding button at slot machine 300), at which point slot machine 300 transmits the current session record to network server 200. Thereafter, a new session record may be initiated at another gaming machine, for example, when the player enters his player tracking card. Regardless of the gaming machine, slot machine 300 preferably transmits the tracked session record to network server 200 for processing at the end of each gaming session (step 1520).

According to some embodiments of the present invention, the administration of a player's insurance policy across multiple gaming machines may include offering additional coverage when a player resumes play at a different machine. For example, a player moving from a $0.25 machine to a $1.00 machine may be offered (and/or required to purchase) an increased amount of coverage, and may be notified of any appropriate change in premium required by the increased minimum wager amount. A player may thus be able to buy any available additional coverage or otherwise modify an existing policy based on the characteristics of the current machine. Conversely, coverage and/or premiums may be decreased if a player moves to a different machine.

Figure 16:
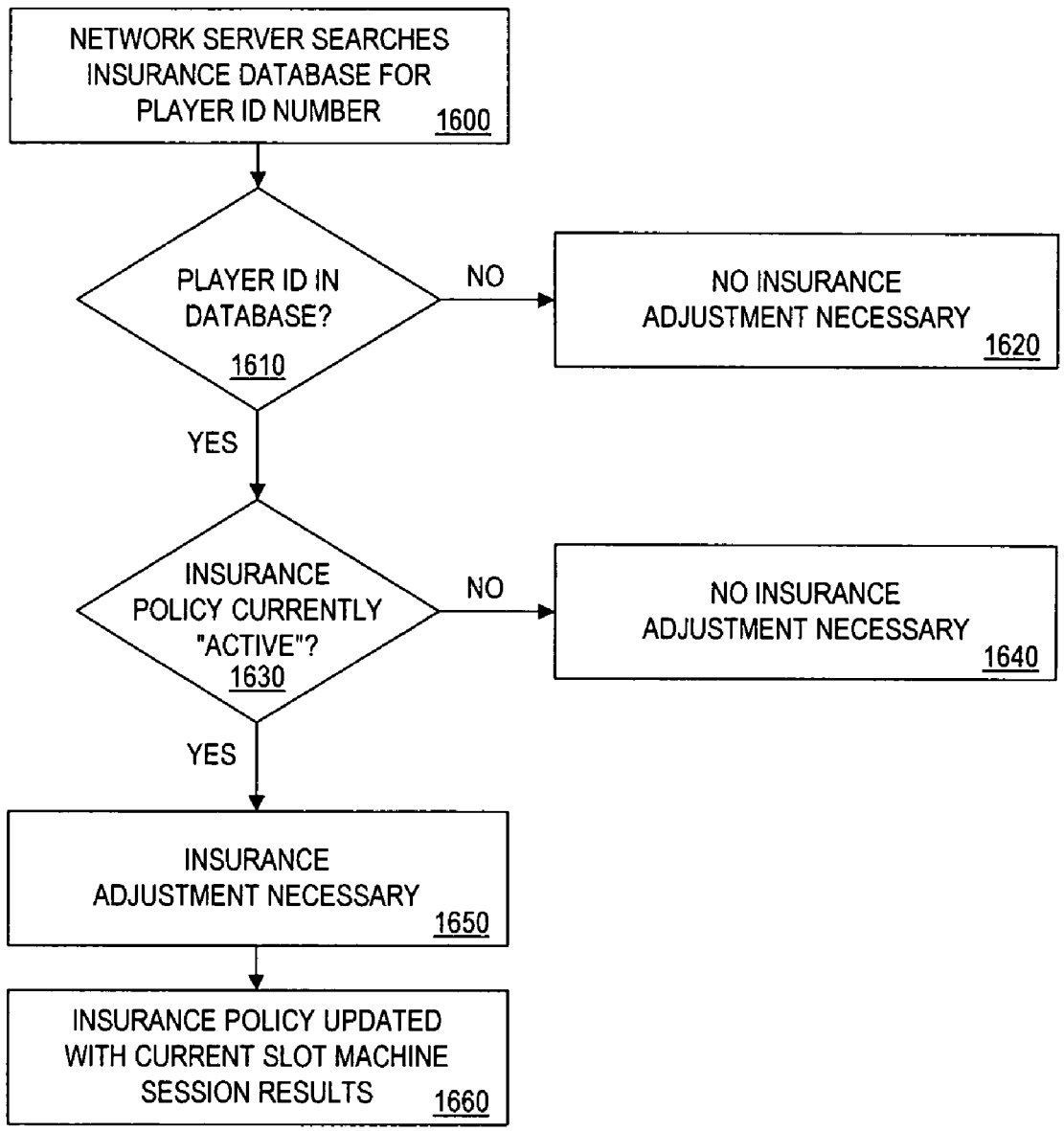
FIG. 16 is a flowchart illustrating a process according to one or more embodiments of the present invention for determining whether an insurance payout is necessary pursuant to activity of a gambling session.

According to one or more embodiments of the present invention, when network server 200 receives the session record from slot machine 300, it processes the data under the insurance policy. FIG. 16 is a flowchart illustrating a preferred process for determining whether an insurance adjustment is necessary. First, network server 200 searches insurance policy database 255 for the player ID (step 1600). If the player ID number is not found in insurance policy database 255 (step 1610), no insurance adjustment is necessary because the player does not have an active policy (step 1620).

If the player ID is found in insurance policy database 255, network server 200 accesses insurance policy status database 265 to see whether the insurance policy is currently active (step 1630). If the insurance policy is not currently active, no insurance adjustment is necessary, and the player is appropriately notified (step 1640). If the insurance policy is "active" or "open", however, and if these gambling results occurred during the coverage period specified in the insurance policy, an insurance adjustment, or payout, is necessary (step 1650). Additionally, the corresponding gambling session entry in gambling session database 260 may be updated with the current slot machine session result (step 1660).

Figure 17:
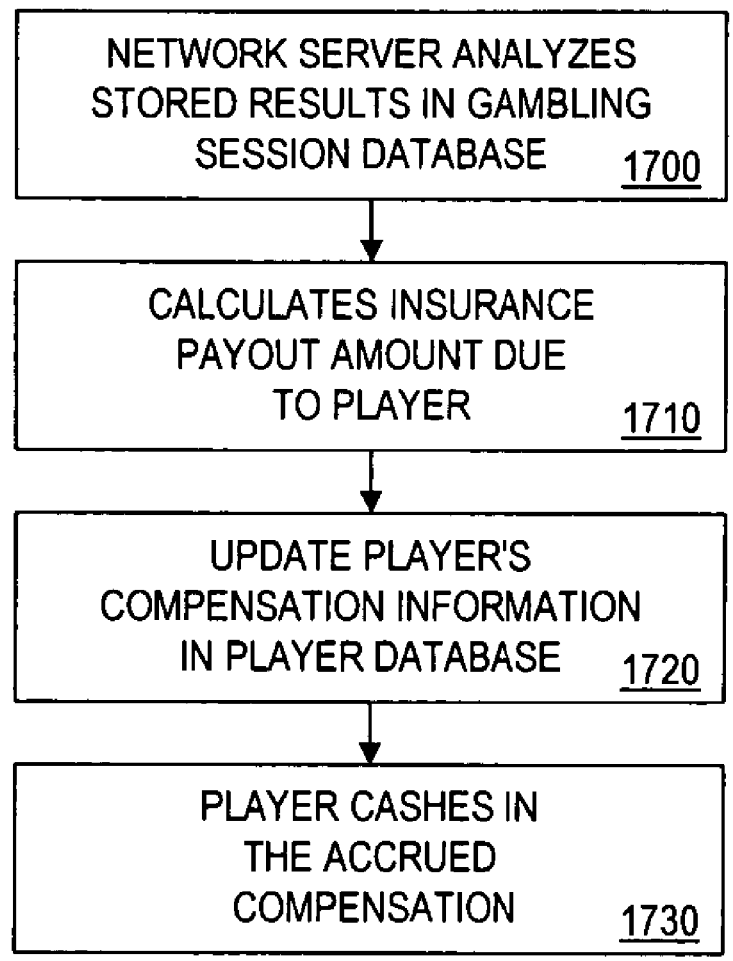
FIG. 17 is a flowchart illustrating a process according to one or more embodiments of the present invention for providing an insurance payout to a player.

FIG. 17 is a flowchart illustrating a preferred process for transmitting an insurance payout (or other benefit) to the player. To make a payout, network server 200 first analyzes the results stored in the appropriate gambling session entry of gambling session database 960 (step 1700). For example, if a loss during the gambling session does not exceed the loss threshold as indicated in insurance policy database 255 (e.g., as represented by the stored term identifiers 730, 740, 750), no insurance adjustment is necessary. If the loss meets or exceeds the specified threshold, CPU 205 of network server 200 calculates an appropriate insurance payout amount due the player according to the insurance policy requirements (step 1710). Once the insurance payout amount is calculated, the payout may be made according to a method specified by one or more terms of the policy.

In the preferred embodiment, network server 200 updates the insurance payout amount 940, 950 of insurance policy status database 265 (step 1720). Thereafter, the player may collect the insurance payout at any time at a cashier's station (step 1730). Paying the player at a location away from a gaming machine or table game may help discourage players from immediately spending the payout, and may be a preferred option amongst the players. Alternatively, the player may choose to transfer the payout directly to his credit card. In that case, network server 200 directly credits the player's credit card by the amount of the payout. Additionally, the player may choose to transmit the payout directly to slot machine 300, in which case the compensation may be disbursed through the payout tray of slot machine 300. Regardless of the payout method, network server 200 preferably updates insurance policy status database 265 to reflect that a payment has been made (e.g., by modifying policy status 920 to indicate a payout amount has been "paid" and/or by updating insurance payout time/date 970 with a time of the payout).

As described above with respect to some embodiments, a player with an insurance policy may be able to "suspend" play at one gaming machine and continue playing at another machine under the policy (e.g., by providing his player tracking card). Some players, however, may "suspend" play under a policy (e.g., by removing a player tracking card) but actually resume play (either at the same gaming machine or at another) without providing a player tracking card. Thus, the system may not be able to identify the player as having a policy. Of course, such play would not be insured. For example, a player receiving a hand of cards corresponding to a potentially high payout (e.g., four Kings in a video poker game) may remove his player tracking card before drawing his fifth card to complete the hand. In this way, the player could possibly avoid the recognition of the win by the gaming system. Thus, the player's losses for the gambling session may be artificially inflated, which may potentially result in an undue insurance payment to the player.

To avoid such gambling activity tracking issues, for the purposes of tracking insured play, the gaming machine and/or server may track gambling activity at a gambling machine even if a player's tracking card is removed during play (e.g., of a particular hand or handle pull), as described above. In some circumstances, the casino or other gaming operator may desire that the player continue to play only under a policy, if one had been purchased. For example, a casino may wish to track all winnings against the policy. Accordingly, some embodiments of the present invention provide for preventing the player from removing the player tracking card from a gaming machine until the period of coverage has expired (e.g., until twenty-five covered handle pulls are completed).

In some embodiments, as described above, a player is able to establish and/or participate in an insured session at a gaming machine without interaction with the server. For example, as described above, a server may not be part of a system or device operable to carry out one or more embodiments.

In one such embodiment, a gaming machine may be operable to facilitate a player's establishment or purchase of an insurance policy without contacting a server. For example, a gaming device may be operable to determine at least one insurance policy available for purchase by a player (e.g., based on one or more parameters input by the player, such as a desired cost of a policy). For example, a gaming machine may be programmed with one or more subroutines and/or formulas for determining a set of parameters (and values therefore) for a policy. In another example, a gaming machine may store in memory one or more pre-packaged insurance policies (meaning the terms thereof have been previously determined and are not calculated by the gaming machine on an ad hoc basis) and retrieve and output (e.g., via a touch-screen display of the gaming machine) one or more of such insurance policies in response to a player request.

In one or more embodiments, whether a gaming machine is in communication with a server or not, the gaming machine (or another device, such as a kiosk) may be operable to output a available insurance policy to a player.

As an illustrative example only, assume a player provides an amount of money by inserting it into the bill validator of the gaming machine. The player then requests an amount of time to play. For example, the player might insert a $20 bill and request 40 minutes of play. The gaming machine then determines other parameters of an insured session. In this example, the gaming machine determines a wager per spin and a payout table for the session. If the player finds this acceptable he presses a button (e.g., mechanical, electro-mechanical or touch-screen button) on the gaming machine to indicate that he wants to go ahead with the session.

In another embodiment, the gaming machine outputs a number of potential insurance session packages to a player. The gaming machine may do so, for example, by outputting a menu of available session packages in response to a players indication of interest in viewing such insurance session packages. An insurance session package may define, for example, a duration of time (e.g., in terms of time, number of games, number of qualifying games, etc.) for which play of a gaming device will be insured as well as any other conditions that apply to play of the gaming device during the duration of time.

Taking the same example of the player providing a $20 bill and requesting a 40 minute session, the gaming machine could create (e.g., by performing one or more calculations), or access from memory based on the parameters input by the player, a series of possible insurance session packages for the player. For example, one insurance session package output to the player in response to the player inputting some parameters of a desired session may define a parameter set that offers 40 minutes of five coin nickel play with a 5/7 jacks or better payout structure while another insurance session package may define a parameter set that offers 40 minutes of five coin dollar play with a payout structure that offered payouts only when a royal flush was obtained. The player could then pick whichever insurance session package best fit his preferences.

In yet another embodiment, a player may specify his budget (e.g. by entering funds into the gaming machine or by entering an indication of available funds into the gaming machine) and be presented with a number of insurance session packages of varying length and payout structure. For example, with a $50 budget the player might be offered the opportunity to purchase either (i) an insurance session package that defines 35 minute three coin quarter play of 6/9 jacks or better, or (ii) an insurance session package that defines 75 minute 5 coin nickel 5/8 jacks or better. In one embodiment, a standard 6/9 jacks or better paytable is used, but the amount of the payouts may scaled by a percentage depending on the amount of the player's budget and/or the amount of time the player wants to play. The amount of time could be expressed as a number of minutes, or as an end time of the session.

Thus, as described, in some embodiments a player may select from a number of insurance policy packages. For example, the following set of insurance policy packages may be output to a player (e.g., via a touch-screen display of a gaming device, kiosk or other device):

1. $50 deductible, max of $100, 50% reimbursement (premium cost $2)

2. $100 deductible, max of $200 50% reimbursement (premium cost $3)

3. $250 deductible, max of $500 50% reimbursement (premium cost $5)

4. $500 deductible, max of $1,000 50% reimbursement (premium cost $10)

5. $1,000 deductible, max of $2,000 50% reimbursement (premium cost $17)

With the first option above, for example, the player receives 50% of his losses between $50 and $100. So if he loses $80, he gets back $15 (50% of $80–$50). If he loses more than $100, he always gets back $25 (50% of $100–$50).

When presented with a list of available insurance policies, it is expected that a player is motivated to pick an option that fits his risk profile. Higher limit gamblers will generally choose an option with a higher max value.

In some embodiments, any or all of the above-described insurance sessions could pay a player any winnings, yet require no payment by the player when a losing session resulted. In such embodiments, the player could be provided with casino credits to play with so as not to place any of his funds at risk (other than the cost of the insurance policy).

In some embodiments, the credit balance of the gaming machine may be allowed to register negative amounts during an insurance session.

In some embodiments, the gaming machine is set to default to insured session play. When the player inserts his player tracking card the gaming machine automatically begins an insured session.

In another embodiment, the player can end an insured session in the middle of the session and receive a ticket (such as a modified cashless gaming receipt) which may be input into another gaming machine (e.g., at the same bank of machines) in order to pick up the insured session where it was left off.

In one embodiment, as described, a player may be provided with an insurance card that has the terms of the insurance policy purchased by the player indicated thereon. In such embodiments, a player may be required to insert the insurance card into the gaming machine in order for the play of the gaming machine to be covered under the terms of the insurance policy. In such an embodiment, a gaming machine may output a warning to a player who has purchased an insurance policy and been issued such a card but has begun playing the gaming device without inserting the card. Such a warning may warn the player, for example, that any play of the gaming machine that the player engages in will not be covered under the player's insurance policy unless the player inserts the insurance card into the gaming machine. The player may be identified as a player who has purchased an insurance policy and been issued a card if, for example, the player inserts his player tracking card into the gaming machine, thus identifying the player. For example, an indication of the insurance policy the player purchased may be associated with the player's identifier of the player's player tracking card in a memory (e.g., a memory of a server, a memory of a gaming machine, etc.). The gaming machine may thus be configured to determine, upon receiving a player tracking card and based on the player identifier of the player tracking card, whether an insurance card and insurance policy is associated with the player identifier. If an insurance card and insurance policy is so associated but the insurance card is not detected as having been inserted into the gaming machine, the gaming machine may be configured to output a warning to the player that play of the gaming machine will not be covered by the insurance policy unless the player inserts the insurance card into the gaming machine (e.g., when an insurance policy associated with the player is active).

It should be noted that, in some embodiments, a parameter of an insurance policy may specify a game, type of game, gaming machine, and/or type of gaming machine that the insurance policy applies to. Similarly, an insurance policy may specify a game, type of game, gaming machine and/or type of gaming machine that is excluded under the terms of the insurance policy. For example, a particular insurance policy or type of insurance policy may only cover play on reeled slot machines (whether mechanical reels or video reels) but not play on video poker or other types of machines. In another example, participation games may not be covered under the terms of an insurance policy. Similarly, a single insurance policy may have different terms or parameters that apply to different games, types of games, gaming machines and/or types of gaming machines. For example, an insurance policy may specify that 100% of losses incurred as a result of play of reeled slot machines are covered but only 25% of losses incurred as a result of play of video poker machines are covered.

CONCLUSION

Systems and methods consistent with various embodiments of the present invention provide gambling loss insurance policies to players and thus may offer protection against gambling losses. Additionally, such systems and methods provide a way of facilitating gambling sessions covered by the gambling loss insurance policies.

It will be apparent to those skilled in the art that various modifications and variations can be made in the present invention and a construction of the invention without departing from the scope or spirit of the invention. Other embodiments of the invention will be apparent to those skilled in the art from consideration of the specification and practice of the invention disclosed herein.

What is claimed is:

1. A method comprising:
receiving, at a gaming machine and from a user, a user identifier that identifies the user;
receiving, at the gaming machine and from the user, policy requirements for a gambling loss insurance policy to provide protection against gambling losses;
determining, by the gaming machine, a premium amount for a gambling loss insurance policy,
in which the premium amount is based on the policy requirements; and
displaying at the gaming machine the information concerning the premium amount.

2. The method of claim 1, further comprising:
receiving from the user a confirmation to purchase the gambling loss insurance policy.

3. The method of claim 1, in which receiving the policy requirements comprises:
receiving from the user an indication of at least one of:
a type of coverage,
an amount of coverage,
a type of gaming machine,
a period of coverage,
a coverage start time,
a coverage end time,
a number of handle pulls, and an amount to be bet by the user.

4. The method of claim 1, further comprising:
receiving the premium amount from the user at the gaming machine.

5. The method of claim 1, further comprising:
receiving a credit card number that is associated with a credit card account, and
charging the premium amount to the credit card account.

6. The method of claim 1, further comprising:
executing a game.

7. The method of claim 6, further comprising:
determining information that is associated with the game.

8. The method of claim 6, further comprising displaying information that is associated with the game.

9. The system of claim 6, further comprising:
determining a result of the game.

10. A method comprising:
receiving at a gaming device an amount a player desires to pay for an insurance policy to provide protection against gambling losses;
determining, based on the amount, at least one requirement of the policy that the player would be required to satisfy in order to have gambling losses protected under the insurance policy; and
outputting the at least one requirement to the player.

11. The method of claim 10, wherein the at least one requirement of the policy defines at least one of:
a type of coverage,
an amount of coverage,
a type of gaming machine,
a period of coverage,
a coverage start time,
a coverage end time,
a number of handle pulls, and an amount to be bet by the user.

12. The method of claim 10, further comprising:
determining a plurality of sets of policy requirements, each set of policy requirements defining a respective insurance policy; and
outputting each of the respective insurance policies to the player for selection.

13. The method of claim 10, wherein determining the at least one policy requirement comprises calculating a value for the at least one policy requirement based on a formula stored in a memory of the gaming machine.

14. The method of claim 10, wherein determining the at least one policy requirement comprises retrieving at least one policy requirement that corresponds to the amount in a memory of the gaming machine.

15. The method of claim 10, further comprising:
determining a game result at the gaming machine.

16. The method of claim 15, further comprising:
determining an insurance payout based on the game result.

17. The method of claim 10, further comprising:
storing an indication of the insurance policy in a database.

18. An apparatus, comprising:
a processor operable to facilitate a wagering game; and
a memory storing a program for directing the processor to
receive, at a gaming machine and from a user, a user identifier that identifies the user;
receive, at the gaming machine and from the user, policy requirements for a gambling loss insurance policy to provide protection against gambling losses;
determine, by the gaming machine, a premium amount for a gambling loss insurance policy,
in which the premium amount is based on the policy requirements: and
display at the gaming machine the information concerning the premium amount.

19. An apparatus, comprising:
a processor operable to facilitate a wagering game; and
a memory storing a program for directing the processor to perform the steps of:
receiving at a gaming device an amount a player desires to pay for an insurance policy to provide protection against gambling losses;
determining, based on the amount, at least one requirement of the policy that the player would be required to satisfy in order to have gambling losses protected under the insurance policy; and
outputting the at least one requirement to the player.

* * * * *